Oct. 17, 1939.  E. A. NORDBERG ET AL  2,176,638
AUTOMATIC RADIO TUNER AND REMOTE CONTROL
Filed May 6, 1936  9 Sheets-Sheet 1
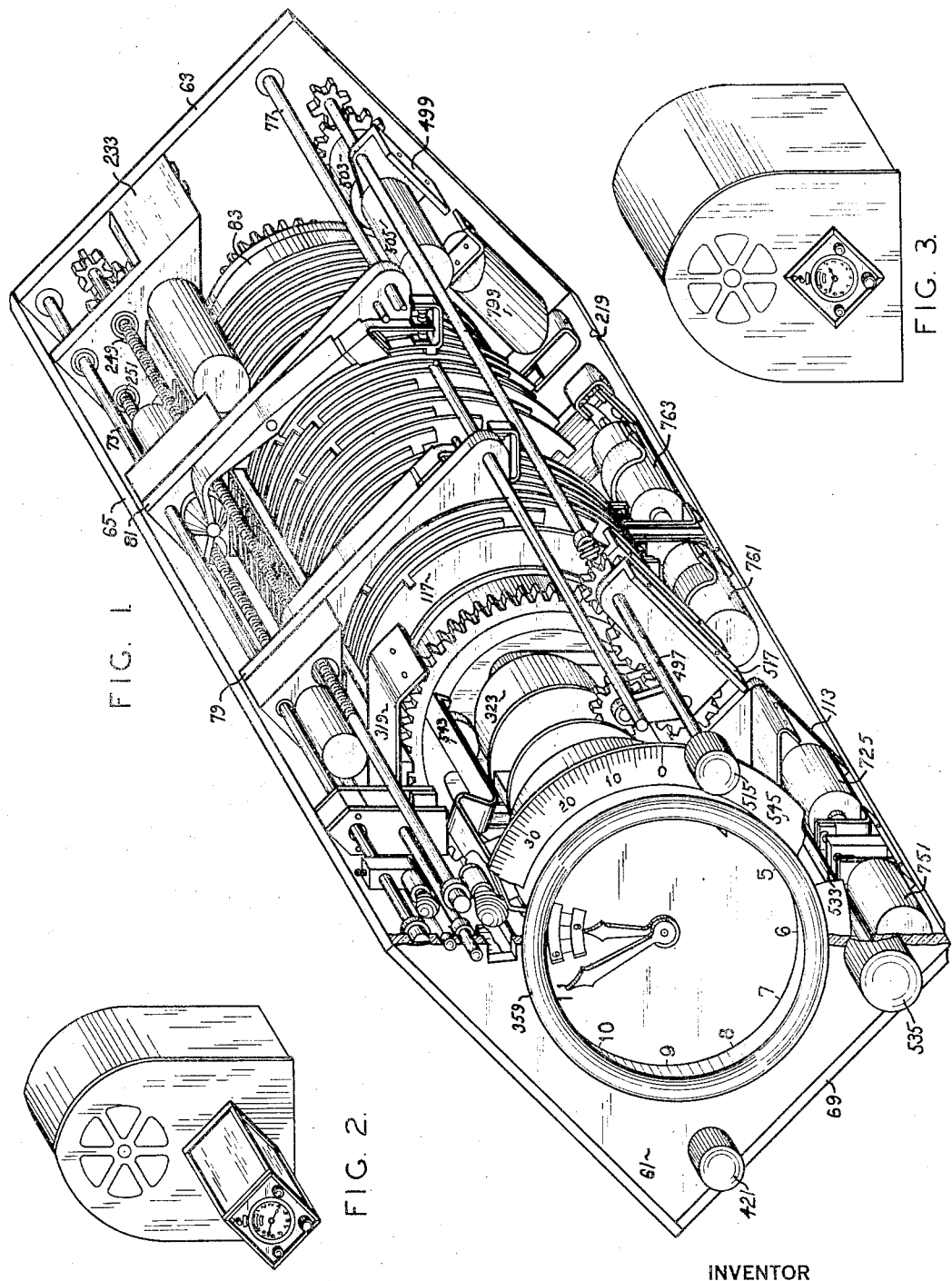
INVENTOR
Ernst August Nordberg
Arthur K. Baker
BY
ATTORNEY

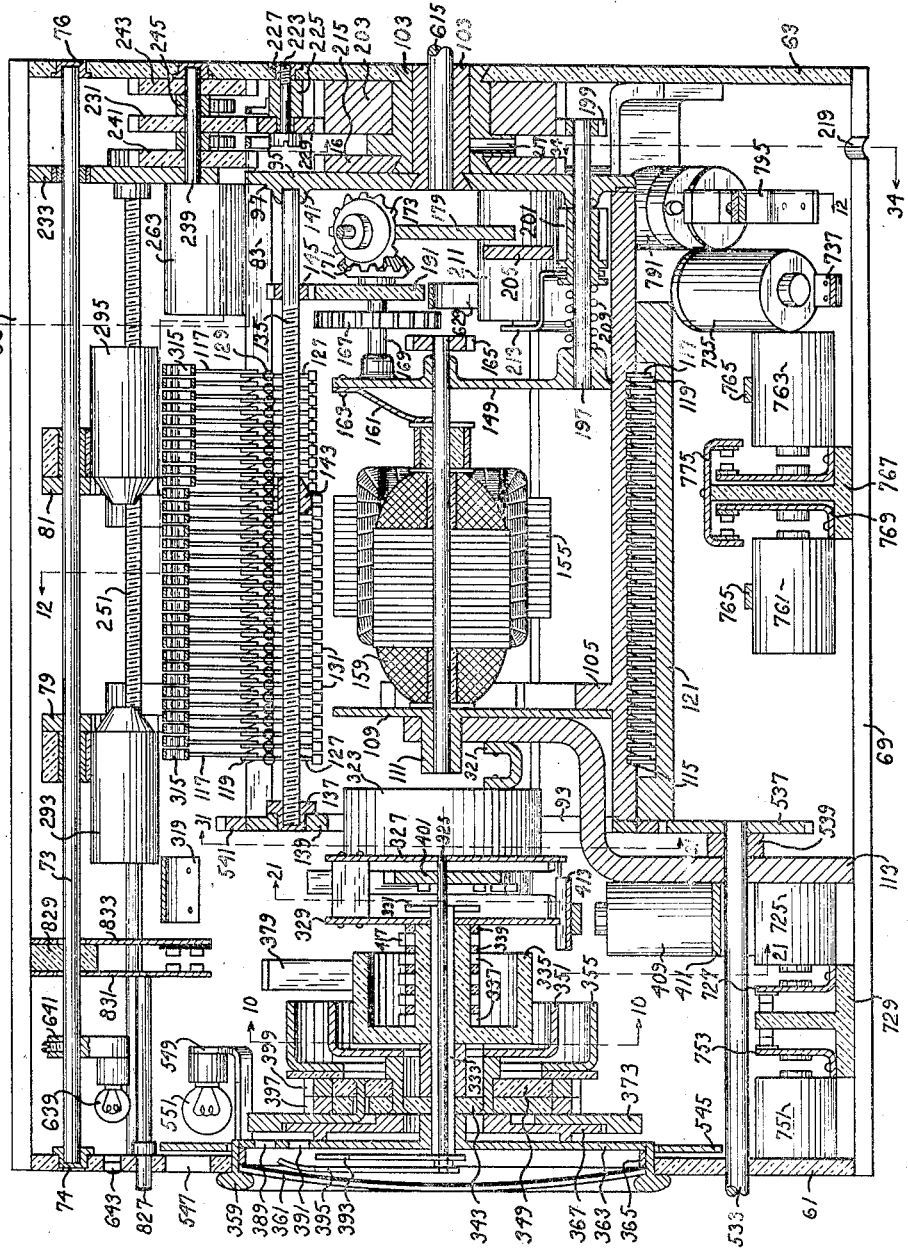

Oct. 17, 1939.  E. A. NORDBERG ET AL  2,176,638
AUTOMATIC RADIO TUNER AND REMOTE CONTROL
Filed May 6, 1936  9 Sheets-Sheet 3

INVENTOR
Ernest August Nordberg
Arthur R. Baker
BY
Ezekiel Wolf
ATTORNEY

Oct. 17, 1939.  E. A. NORDBERG ET AL  2,176,638
AUTOMATIC RADIO TUNER AND REMOTE CONTROL
Filed May 6, 1936  9 Sheets-Sheet 4
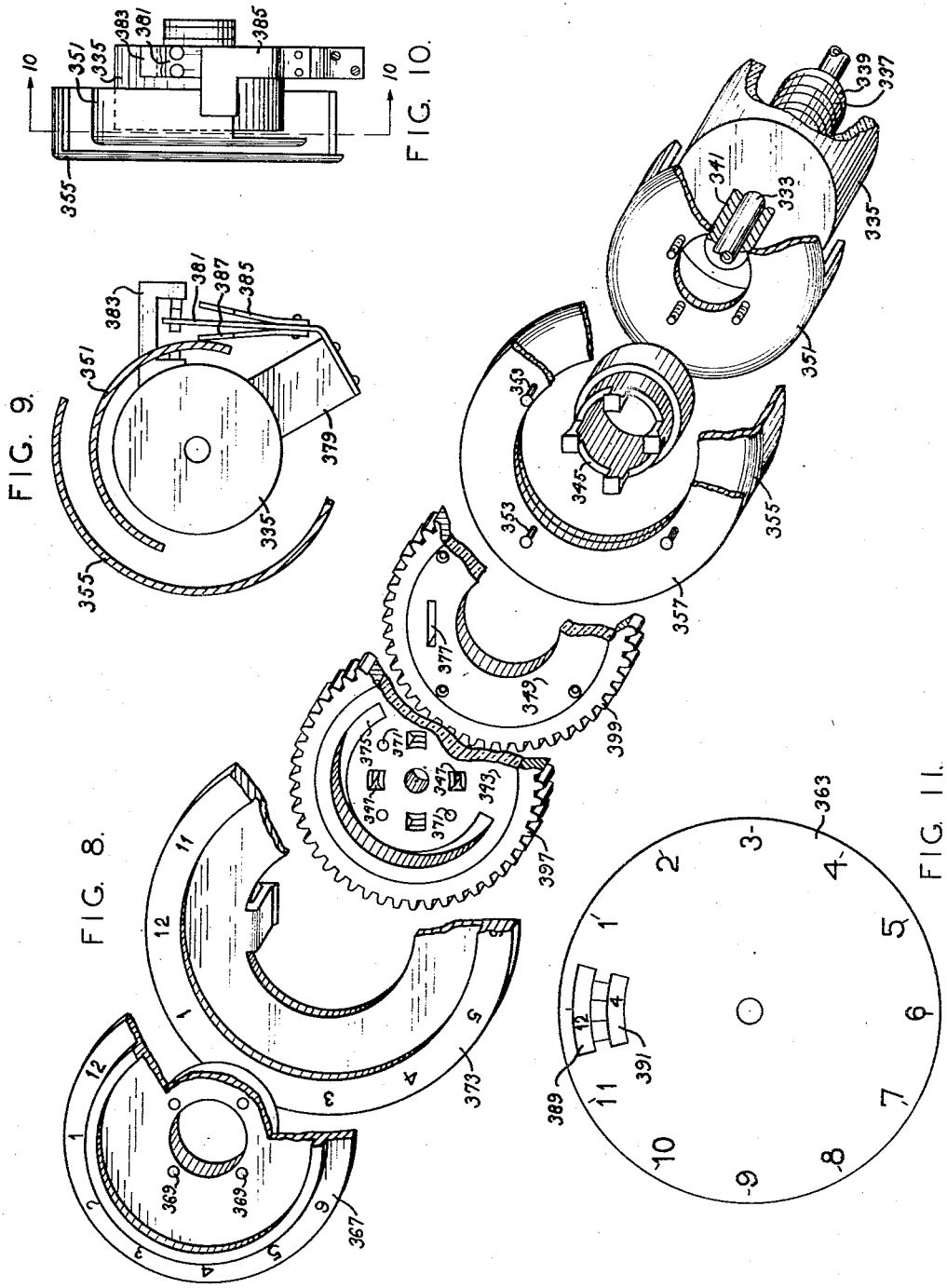
INVENTOR
Ernst August Nordberg
Arthur K. Baker
BY
Ezekiel Wolf
ATTORNEY Oct. 17, 1939.  E. A. NORDBERG ET AL  2,176,638
AUTOMATIC RADIO TUNER AND REMOTE CONTROL
Filed May 6, 1936  9 Sheets-Sheet 5
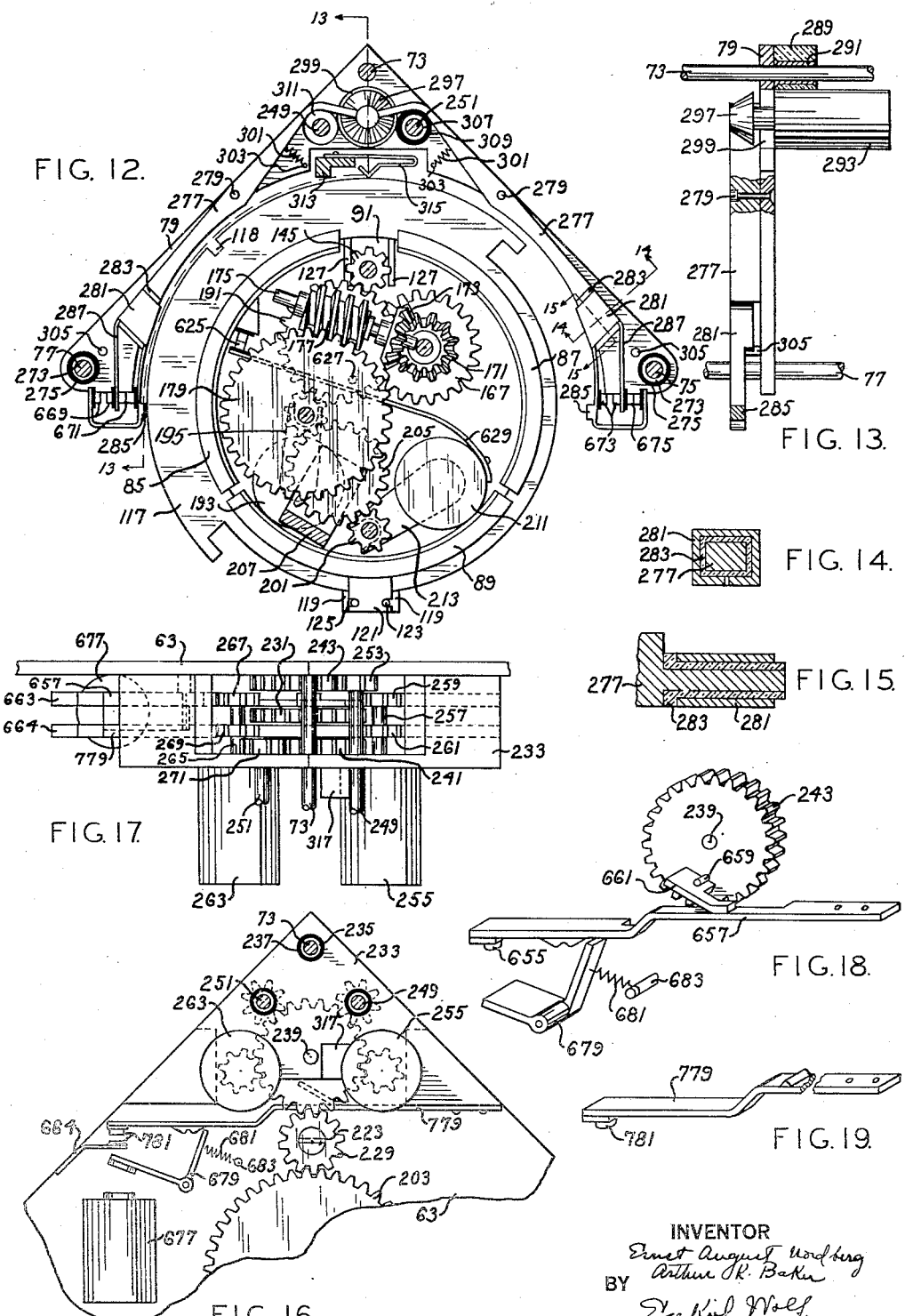
INVENTOR
Ernest August Nordberg
Arthur R. Baker
BY
Ezekiel Wolf
ATTORNEY Oct. 17, 1939.  E. A. NORDBERG ET AL  2,176,638
AUTOMATIC RADIO TUNER AND REMOTE CONTROL
Filed May 6, 1936  9 Sheets-Sheet 6
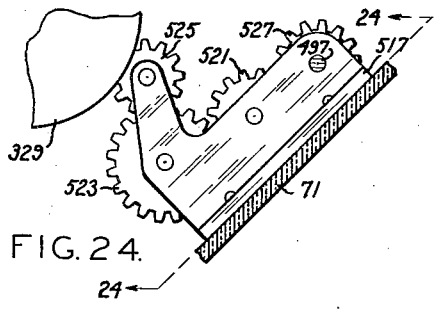
FIG. 24.
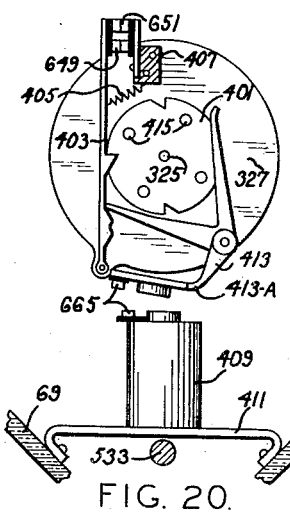
FIG. 20.
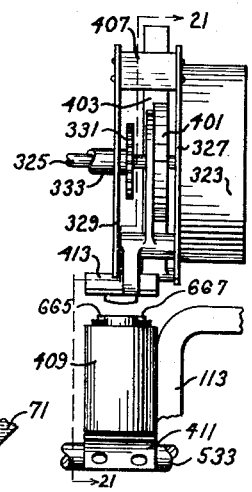
FIG. 21.
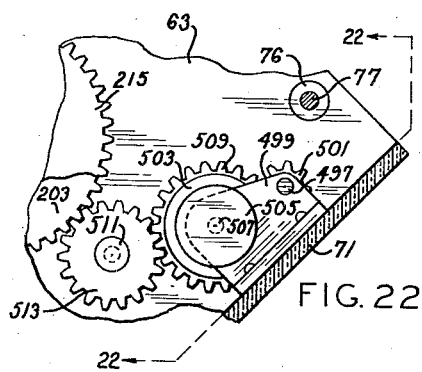
FIG. 22.
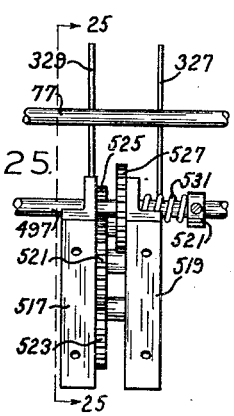
FIG. 25.
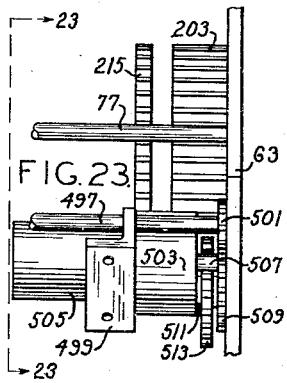
FIG. 23.
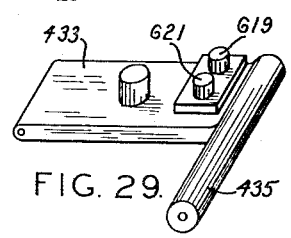
FIG. 29.
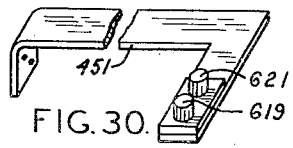
FIG. 30.
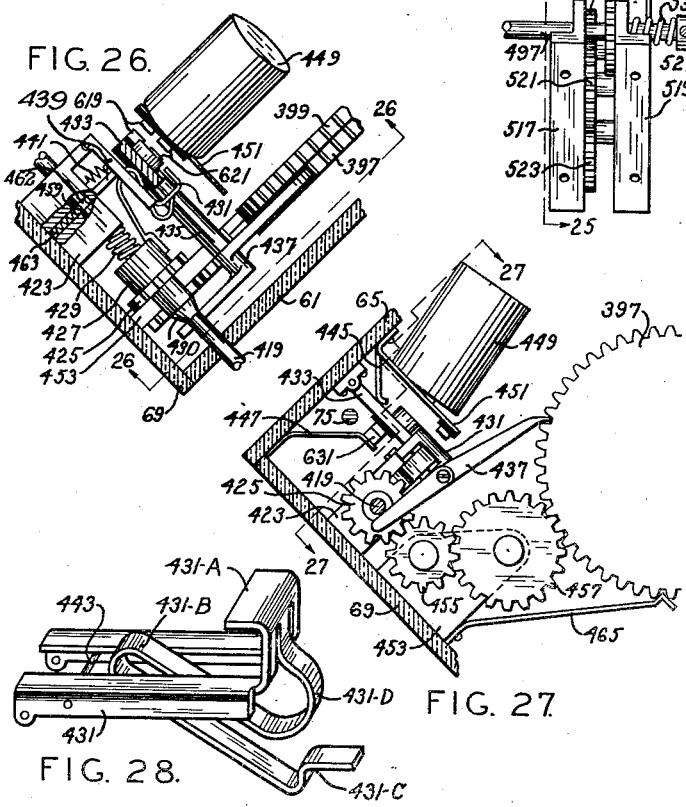
FIG. 26.
FIG. 27.
FIG. 28.
INVENTOR
Ernst August Nordberg
Arthur K. Baker
BY
Ezekiel Wiley
ATTORNEY

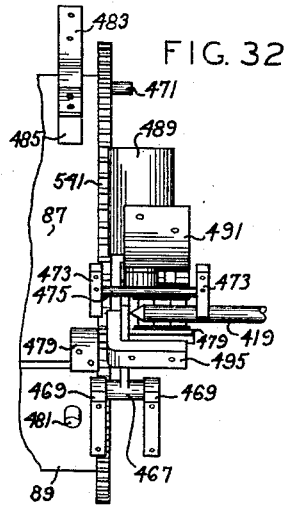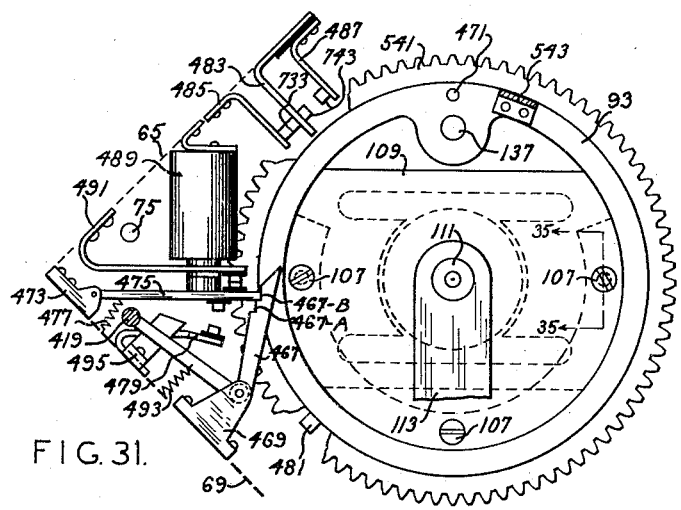
FIG. 32.
FIG. 31.
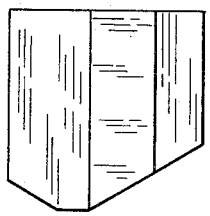
FIG. 33.A.
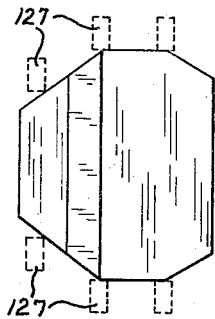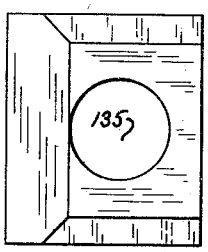
FIG.33B    FIG.33C.
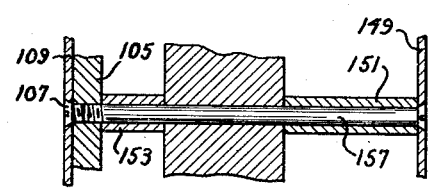
FIG. 34.
FIG. 35.
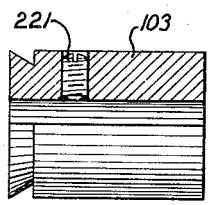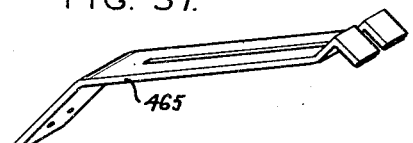
FIG. 37.
FIG. 36.

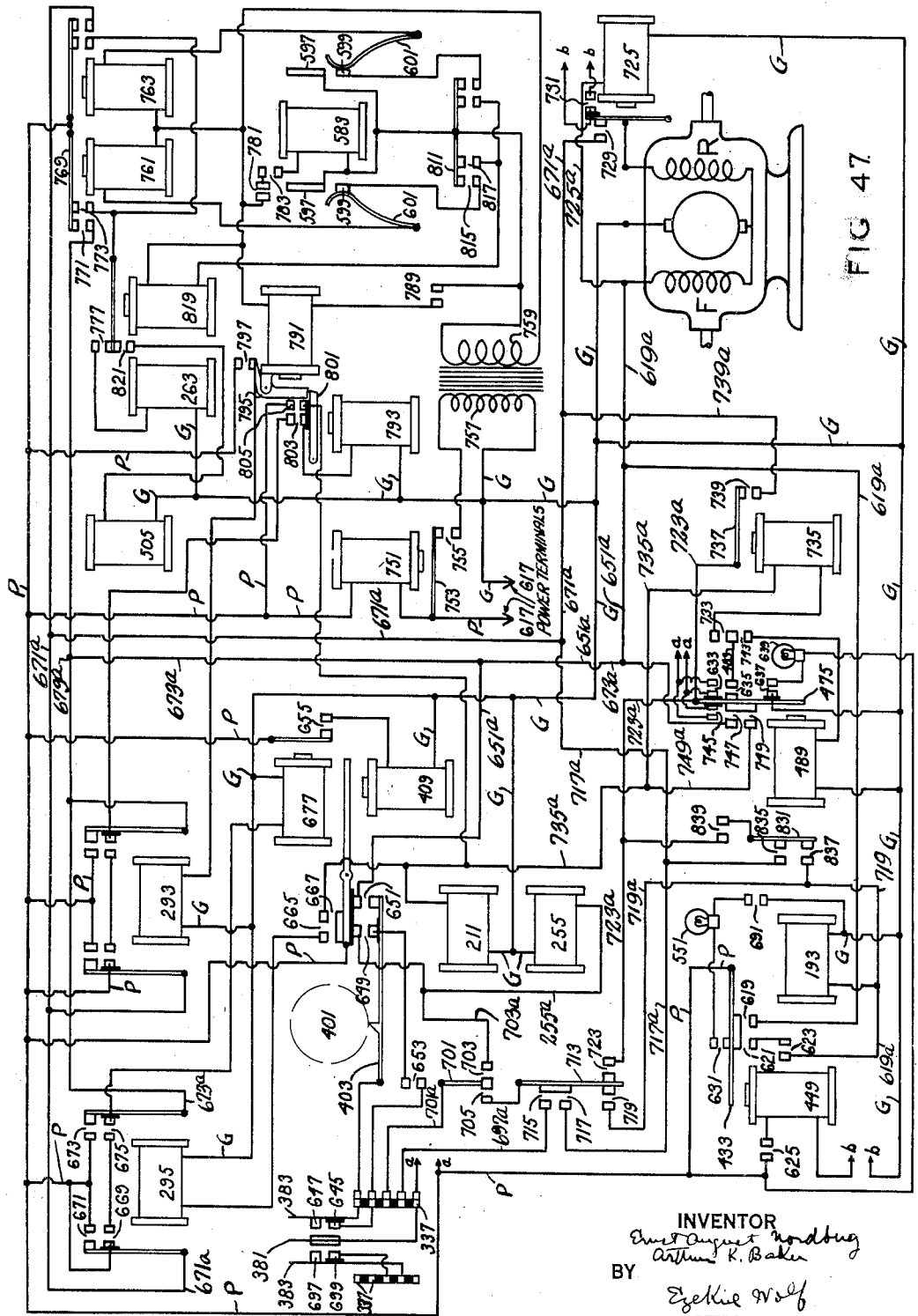

Patented Oct. 17, 1939

2,176,638

UNITED STATES PATENT OFFICE 2,176,638

AUTOMATIC RADIO TUNER AND REMOTE CONTROL

Ernst August Nordberg, Long Island City, N. Y., and Arthur K. Baker, Nutley, N. J.

Application May 6, 1936, Serial No. 78,260

14 Claims. (Cl. 250—40)

The invention relates to automatic radio tuners and particularly to automatic radio tuners adapted to tuning in any wavelength at any predetermined time.

The main object of the invention is to provide a tuning element, upon which, wavelength settings are inserted, together with a timing element, which will automatically control the tuning in of the previously chosen wavelengths, at the time those wavelengths are desired.

Another object is not to limit the user to a certain group of stations, but to allow the setting up of any station that the user's radio set can tune in.

Another object is to provide means for the device to automatically switch the radio set on, when the time for the desired program arrives, and to automatically switch the radio set off at the expiration of the time interval set up for.

Another object is to provide means for automatically switching the radio set on and off, intermittently, for any multiple period of fifteen minutes, as frequently as desired.

Another object is to provide an automatic visual means, whereby the operator, in setting up the desired program, always knows the next time interval to be set up, as well as the limits of the time interval set up for.

Another object is to provide a visual means to indicate that the device has been set up for a future time interval.

Another object is to provide means, so that the tuning element of the device automatically goes back to the initial starting position at the conclusion of the time interval set up, thereby making itself ready for a new set-up.

Another object is to provide a remote control, whereby any one of a series of definite stations can be exchanged for that station that happens to be tuned-in at that time.

Another object is to allow the tuning in of remote control stations at any time.

Another object is to allow the utilization of manual control for tuning and volume control at all times.

Another object is to provide volume control from the remote control unit.

The invention possesses many other advantageous features, some of which, with the foregoing, will be set forth at length in the following description, where we shall outline in full, that form of the invention which we have selected for illustration in the drawings accompanying and forming part of the present specification. In said drawings we have shown one embodiment of our invention, but it is to be understood, that we do not limit ourselves to such form, since the invention, as set forth in the claims, may be embodied in a plurality of forms.

It is manifest that the invention comprising the means for automatically rotating a tuning element of a radio set may be combined with any suitable form of machine in which a predetermined angular sequence is desired over a period of time. It is also manifest that units of the device such as the timing unit may be combined with other devices for initially switching them on at a certain time and then switching them off at the expiration of a chosen time interval. In the accompanying drawings we have shown the invention embodied in an automatic radio tuner comprising a rotatable tuning element in which the desired wavelengths are inserted, a timing element for setting in operation the tuning element at the proper times, and a remote control unit for tuning a radio set from a distant point. Further, in the machine shown in the drawings, the cams or discs on the tuning element are locked at their respectively chosen wavelengths by a combination electrical and mechanical means which wedges a clamp into a V shaped groove, but it is to be understood that other suitable or well-known means may be employed for locking the cams in place as well as introducing the desired wavelength into the machine and retaining them. It is preferable, however, to embody the invention in an automatic radio tuner wherein the wavelengths are introduced into the machine by the rotation of the tuning element to the wavelength desired later, and the depression of a switch upon the completion of the wavelength setting. The radio tuner shown in the accompanying drawings is of the drum type, embodying a rotatable tuning element or drum, which can be rotated from initial or neutral stop position through an angle of substantially 180 degrees or fraction thereof, and stopped at the wavelength desired. The wavelength selectors are arranged on carriages, normally stationary with respect to the tuning drum and displaceable longitudinally to make direct action with the various wavelength cams or discs on the tuning drum possible. The tuning drum is rotated by an electric motor and the wavelength selectors are displaced by the same motor. The electric motor is of the reversible displaced field type to provide motion of the tuning drum and wavelength selectors in either direction, as well as acting as its own clutch to provide instant stopping of the associated moving gears.

The timing element is of the self starting alternating current type clock and is displaced axially with respect to the tuning drum. Associated with the clock are timing cams for setting into operation the tuning sequence and returning the entire machine to initial or neutral stop position at the expiration of the time interval set up for. Associated with the above units of the device are various mechanical movements, electromechanical devices, switches, solenoids, and so forth, which will be explained in the description following, together with their cycles of use.

Referring to said drawings:

Figure 1 is an oblique view, partly broken open, of one type of automatic radio tuner embodying our invention, and having the tuning element or drum rotated 90 degrees from initial or neutral stop position.

Figures 2 and 3 are oblique views showing two possible methods of incorporating the invention with a radio receiving set cabinet.

Figure 4 is a longitudinal vertical section of the invention as shown in Figure 1, taken through the axis of the invention, and showing in particular, the V shape of the grooves in which the cams rest, the operation of the locking block, and the displaced motor fields.

Figure 8 is an exploded oblique view showing the construction and details of the timing elements.

Figure 9 is a view taken on line 10—10 of Figures 4 and 10, showing the principle of the starting and stopping times.

Figure 10 is a side view of Figure 9, showing the arrangement of the cams and the associated switch.

Figure 11 is an enlarged view of the clock face of the invention showing how starting and stopping times are made visual.

Figure 12 is an end view of the device, with the rear end plate removed, taken on the line 12—12 of Figure 4, showing in detail a wavelength selector carriage with its associated electrical contacts, showing the shape of the cams or discs, and showing the arrangement of the gears within the drum.

Figure 13 is an internal side view of the wavelength selector mechanism taken on the line 13—13 of Figure 12, showing the method of opening and closing the wavelength selector arms.

Figure 14 is a cross section taken on the line 14—14 of Figure 12, showing how the cam contacts are fastened to the wavelength selector arms.

Figure 15 is a cross section taken on the line 15—15 of Figure 12, showing the same as Figure 14.

Figure 16 is a transverse vertical section taken on the line 16—16 of Figure 4, showing the arrangement of the associated wavelength selector carriage driving gears and the associated gear shifters together with the associated switches.

Figure 17 is a top elevation of Figure 16 showing the same as Figure 16.

Figure 18 is an oblique view showing in detail the principle of the switch associated with the automatic wavelength selector carriage.

Figure 19 is an oblique view showing the switch arm associated with the remote control wavelength selector carriage.

Figure 20 is a transverse vertical section taken on the line 21—21 of Figures 4 and 21, showing the fifteen minute cam and switch with the associated switch-off electromagnet.

Figure 21 is a side view of Figure 20 showing the same as Figure 20.

Figure 22 is an end view taken on the line 23—23 of Figure 23, showing the arrangement of the volume control gears and gear shifter.

Figure 23 is a side view of the volume control mechanism taken on the line 22—22 of Figure 22, showing the same as Figure 22.

Figure 24 is an end view taken on the line 25—25 of Figure 25 showing the gear arrangement of the clock hand setter mechanism.

Figure 25 is a side view taken on the line 24—24 of Figure 24, showing the same as Figure 24.

Figure 26 is a cross section taken on the line 27—27 of Figure 27, showing in detail the set-up button switch spring operation.

Figure 27 is a view taken on the line 26—26 of Figure 26, showing the arrangement of the gears associated with the starting time, and the retainer spring.

Figure 28 is an oblique view showing the shape of the set-up button switch spring.

Figure 29 is an oblique view showing the set-up button switch spring armature bar.

Figure 30 is an oblique view showing the shape of the contact strip associated with the contacts on the under side of the armature bar shown in Figure 29.

Figure 31 is an end view of the tuning element or drum taken on the line 31—31 of Figure 4, leaving out much extra detail but showing the means for rotating the tuning drum back to its initial or neutral stop position, and showing the outline of the mounted motor within the drum.

Figure 32 is a side elevation of Figure 31, showing more detail of the means for rotating the tuning drum back to its neutral stop position.

Figure 33 shows a top, side, and end view of the locking block designated by the letters A, B, and C respectively to make its construction and operation clear.

Figure 34 is a view taken on the line 34—34 of Figure 4, leaving out much detail, but showing the arrangement of some of the electromagnets and switches.

Figure 35 is a cross section taken on the line 35—35 of Figure 31, showing the method of fastening the motor and motor end plates within the drum.

Figure 36 shows the means for fastening the invention to the radio receiving set tuning condenser or other rotatable tuning element.

Figure 37 is a view showing the construction of the retaining springs associated with the starting and stopping time cams.

Figure 47 is the electrical wiring diagram of the invention.

Figure 5:
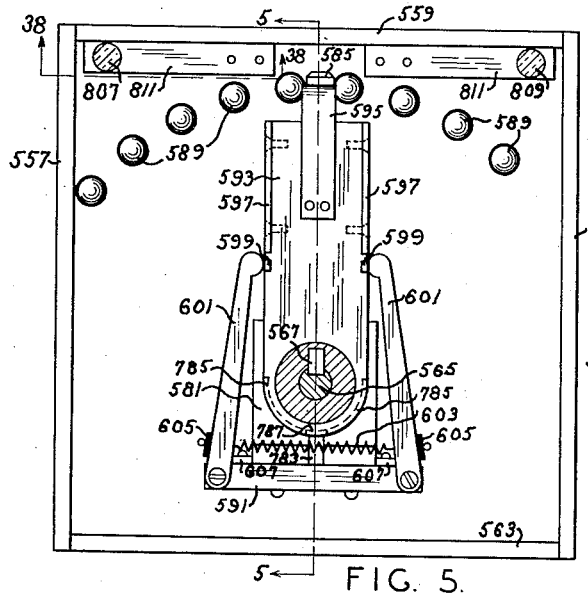
Figure 5 is a horizontal view taken on line 6—6 of Figure 6, showing the principle of the remote control unit.

The automatic radio tuner shown in the accompanying drawings is of the rotatable drum type, in which the wavelength settings are introduced into the tuner by the rotation of the drum, followed by the closing of a switch. The rotation of the drum to the wavelength desired at some future time causes the cam or disc associated with that time to be rotated relative to the drum. The depression of the switch, following this rotation, locks the said disc to the drum, so that further rotation of the drum will carry the said disc with it. The wavelength settings introduced into the tuner, are transmitted on the future rotation of the drum at the proper time to the radio receiving set tuning condenser which is directly coupled axially to the tuning drum in order to obtain greatest accuracy of tuning, by means of the automatic wavelength selector arms, which, for the purpose of making direct action of the selected wavelength on the tuning drum of highest value possible are disposed in a parallel displaceable relation to the tuning drum axis.

One of the objects of the present invention is to provide an automatic radio tuner, in which the mental effort of the operator is reduced to a minimum in setting up the device for a time interval, and is finished as soon as the factors involved in setting up have been entered into the tuner. This is particularly advantageous in a power driven radio tuner since it eliminates the necessity of the operator remembering the time for a future program in order to tune it in at that time. Radio tuners have been constructed in the past, but the user has been limited to a certain number of wavelengths, and the tuning in of any wavelength not included in this group had to be done manually at the time that wavelength was desired. Also, the changing of this group of picked wavelengths to some other group of wavelengths, required the labor of an experienced radio service-man. An object therefore, of this invention is to allow the automatic future tuning in any wavelength desired, and at the same time provide means, whereby, the ordinary user can change the established remote control wavelengths very easily at will. Thus the present tuner not only reduces the manual effort necessary to adjust the tuner to the wavelength desired, but greatly reduces the mental effort, the only mental effort necessary is that required to insure the proper entry of the wavelengths desired into the tuner.

The automatic radio tuner and remote control shown in the drawings, and which embodies the present invention comprises two separate units, an automatic tuner unit having two dielectric end plates 61—63 between which the tuning drum, wavelength selector mechanisms, and time control mechanisms are arranged together with their associated solenoids, magnets, etc., and a remote control box unit. The automatic tuner unit includes a tuning drum unit which is directly coupled axially with the tuning condenser or other rotatable tuning unit of a radio receiving set and capable of 180 degree rotation, an automatic wavelength selector carriage and a remote control wavelength selector carriage both of which are parallel longitudinally displaceable with relation to the tuning drum, a self-starting alternating current electric clock longitudinally displaced axially with respect to the tuning drum, a timing unit which is mounted concentric with the electric clock hour and minute hand shafts and which determines the starting and stopping times of the program set up, the duration of any one wavelength, and initiates the change to another wavelength at the proper time, means for initiating the tuning drum to rotate the radio receiving set condenser to the proper wavelength, a visual time indicator for showing the starting and the stopping times of the time interval set up, a set up switch button for initiating the locking of any wavelength desired into the drum, a locking block parallel displaceable with relation to the axis of the tuning drum for doing the actual locking of the wavelength desired, a volume control capable of manual and remote control, a manual tuning control, a visual wavelength tuning scale, and other devices for controlling the rotation of the tuning drum, the displacement of the wavelength selector carriages, the setting up of initial starting time and other instrumentalities. The tuner contains all of the elements necessary to quickly and accurately perform the operations of tuning in a wavelength or program of wavelengths for a predetermined period of time after being set up and these operations are performed automatically. The remote control box unit includes a station indicator bar, a follow mechanism for guiding the remote control wavelength selector carriage within the automatic tuner unit to the proper wavelength disc, means for initiating the tuning drum to rotate the radio receiving set tuning condenser to the proper wavelength, volume control switches, a visual station indicator scale, and other instrumentalities. The remote control box unit contains all of the elements necessary to initiate the tuning drum in the automatic tuner unit to the proper wavelength.

The automatic tuner unit Figures 1—2—3—4, is provided with four dielectric side plates 65—67—69—71 between which are disposed the end plates 61—63. Extending between the end plates 61—63 are the fixed longitudinal rods 73—75—77 which are held in the cups 74—76, and which guide the wave-length selector carriages 79—81 in their longitudinal motion over the tuning drum 83. The tuning drum 83 is a hollow cylindrical drum which is cut into three substantially equiangular segments 85—87—89 Figure 12 and between the edges of 85 and 87 is left the open space 91. The pieces 85—87—89 are held in position to form the tuning drum by the end ring 93 and the end plate 95, both of which are provided with annular steps 97 which fit into corresponding grooves in the ends of 85—87—89, the screws 99 holding the entire tuning drum unit together. Centrally located in the end plate 95, riveted or otherwise fastened is the projecting hub 101, which rotates in the sleeve 103 riveted to the dielectric end plate 63. Within the drum, and an integral part of the drum is the raised rim 105 to which is fastened by the screws 107, the motor end plate 109 which has a centrally located projecting hub 111 which rotates in the bracket 113 which in turn is fastened to the side plates 69—71. By means of the bracket 113 and the hub 103, the tuning drum is held in its proper place within the unit free to rotate.

In the periphery of the tuning drum 83 are the substantially V shaped grooves 115, one side of which are perpendicular to the axis of the drum and the other sides are at an angle of possibly 20 degrees to the perpendicular face, leaving a flat equal in width to the thickness of the wavelength cam at the bottom of the groove. In these grooves are the wavelength cams or discs 117, shaped as shown in Figure 12, and having a circular hole in them equal in diameter to the diameter of the flat bottom of the grooves in the tuning drum and an outer diameter extending substantially 180 degrees around the disc. Midway in the arc of this outer diameter is the notch 118 which is engaged by the zero retaining springs 315. These wavelength cams or discs are put on the drum by collapsing the same and rest against the perpendicular sides of the grooves. Adjacent to these discs and resting against the sloped faces of the grooves are the substantially C shaped locking clamps 119, one end of each of which are pivoted at the zero bar 121 Figure 12, by means of the rods 123 which lie in the grooves 125 of the zero bar, the rods 123 being held in place by riveting the edges of the grooves over the rods. The zero bar 121 is raised at each end to allow the rotation of the wavelength discs angularly for 180 degrees, and is fastened to the section 89 of the drum diametrically opposite the space 91. At the other end of locking clamp is the projecting tail 127 which passes through the space 91, so that control of these clamps may be had from within the drum. Passing between the opposite pairs of clamp tails are the helical springs 129 which normally draw the clamps into the grooves of the drum and wedge the discs to the drum in whatever position the discs may be rotated to with relation to the drum.

Disposed within the tuning drum are the flat locking clamp retainer springs 131 Figures 4—41 each of which lies in the plane of the locking clamps, the free ends of which have a rectangular projection in contact with the ends of one pair of the projecting tails of the locking clamps, the other ends of which are fastened to the bar 133 which is fastened to the inside of the drum on the section 87. These springs 131 normally hold the locking clamps open thus allowing the rotation of the wavelength discs through an angle of 180 degrees but if these springs 131 are held from contact with the tails of the locking clamps, the locking clamps are drawn into the grooves by the normal action of the helical springs 129, locking the discs in position. The 180 degree rotation of the wavelength discs is limited by the zero bar 121 which prevents greater rotation.

One drum groove, one disc, one pair of locking clamps and one locking clamp retainer spring may be called a single wavelength unit, and since the present tuner has thirty-two uniformly spaced discs, there are thirty-two such wavelength units; eight of which are reserved for remote control, and the remaining twenty-four are the equivalent of twenty-four fifteen minute intervals, or six hours. The desired capacity of the tuner determines the number of units to be employed.

Located approximately centrally in the space between the springs 127—131 and the tails of the corresponding pairs of locking clamps, is the partly threaded shaft 135 which is longitudinally parallel to the axis of the tuning drum and centrally located with respect to the space 91, on the threaded end of which is fastened the stepped bearing cap 137 which rotates in the projecting ear 139, the said ear being an integral part of the end ring 93. The other end of the shaft is a flat pivoted bearing in the boss 141 which is a part of the end plate 95. Threaded on this shaft 135 is the locking block 143 Figures 4—33, which is a hardened steel block and may be termed a compound wedge, and permanently fastened to the threaded shaft 135 is the spur gear 145 which rotates the shaft 135 causing motion of the locking block 143 in either direction, depending on the direction of rotation of the shaft. In consequence, the locking block is so designed that longitudinal motion in one direction along the shaft 135 causes the flat locking clamp retainer springs 131 mentioned above to be held from contact with the tails 127 of the locking clamps thus allowing the normal action of the helical springs 129 to draw the locking clamps into the grooves, lock the wavelength discs in position and retain them so locked after the passage of the locking block; motion of the locking block in the opposite direction separates the tails of the locking clamps thus unlocking the discs and allows the rectangular projections of the flat springs 131 to fall between the corresponding pairs of locking clamp tails by their normal action thus retaining the locking clamps in the unwedged position after the passage of the locking block in this direction, leaving the wavelength discs free to rotate in their respective grooves. With reference to Figure 33, we have designated, that view containing the locking clamp tails 127 in dotted line as the front view of the locking block, the view immediately above it as the top view, this view being the same as that shown of the said block in Figure 4, and the view immediately to the right of the front view as the end view. The upper and lower sides of the locking block are symmetrical with reference to a central plane as shown in the front view of Figure 33 and are formed, by truncating both ends of a double-ended wedge perpendicular to the central plane, and by leaving flat surfaces parallel to the central plane between the bases of the two formed wedges. These upper and lower faces are the cam surfaces against which the tails 127 of the locking clamps make action. With reference to the two opposite faces perpendicular to the central plane mentioned above or perpendicular to the flat surfaces mentioned above, one is flat and faces the helical springs 129 Figure 4, and the other is a cam-like surface of a substantially flat bottomed V the vertex of the V being furthest displaced from the flat face, one leg of the V joining the flat bottom in a line determined by a plane, perpendicular to the central plane mentioned above, perpendicular to the flat face, and forming the base of that wedge of the two mentioned above that is furthest from the end point of the V leg, the flat bottom of the V being parallel to the flat face and having a length slightly less than one-half the height of the farthest wedge mentioned above, and the remaining leg of the V forming the remainder of this cam-like surface. This surface is the surface against which the locking clamp retainer springs 131 make action. Lying in the central plane, parallel to the flat surface, perpendicular to the truncated wedge ends, and approximately centrally located with respect to the maximum cross sectional outline as shown in the end view of Figure 33, is the threaded hole through which is threaded the shaft 135 to cause operation of the locking block as previously explained.

The rotation of the drum for automatic and remote control tuning, the locking and unlocking of the wavelength discs, the motion of the wavelength carriages, the zeroing of the drum to initial or neutral stop position, and the volume control by remote control are accomplished by means of a reversible displaced field type motor 147 Figures 4—31, which is preferably mounted axially within the tuning drum by suitable means, and is so mounted to prevent the torque of the motor from rotating the drum while locking the discs at their respective wavelengths, which would probably occur if the motor were mounted without the drum, and thereby destroy the accuracy of the wavelength disc setting, before the said disc was locked in place on the drum. Passing through, the motor end plate 149, the spacers 151—153 and the motor field 155 and the raised rim 105 are the screws 157 Figures 4—31—35, which hold the motor field in position. Suitably journalled in the motor end plates 109—149 is the motor armature 159 which is held displaced with reference to the field when no current is in the field windings by the spring 161 which is fastened to the end plate 149 by the rivets 163 or other suitable means. Secured to the end of the armature shaft is the pinion 165 which is out of mesh with the gear 167 Figure 4 when the armature is in its normally retracted position. The magnetic field resulting from the flow of current in the motor causes the armature to centralize itself in the said magnetic field and engage the pinion 165 with the gear 167. The armature is made retractable so that the angular momentum of the armature after the motor current is switched off will not cause further rotation of the gear train beyond the pinion 165. The gear train will be described hereinafter.

Suitably journalled in the motor end plate 149 and the drum end plate 95 and disposed parallel to the motor armature shaft is the shaft 169 on which are fastened the spur gear 167 and the bevel gear 171, Figures 4—7—12. The bevel gear 171 meshes with the bevel gear 173 which is fastened to the shaft 175, the shaft 175 being suitably journalled to the drum end plate 95 and disposed parallel to it and on which is fastened the worm gear 177 which meshes with the worm wheel 179. Disposed parallel to the motor armature shaft and suitably journalled in the motor end plate 149 and the drum end plate 95 is the splined shaft 181, to which is fastened the worm wheel 179 and the adjacent pinion gear 183, and to which is splined, free to move longitudinally the throated spur pinion gear 185 which is normally held from engagement with the gear 191 by a helical spring which is wound around the splined shaft 181. Disposed parallel to the motor armature shaft is the stud 189 which is an integral part of the motor end plate 149 and on which is suitably journalled, the dielectric spur gear 191. The gear 191 meshes with the gear 145 to rotate the locking block shaft when the throated pinion gear 185 is in mesh with the gear 191. The thread pitch on the locking block shaft 135 and the ratio of diameters of the gears 145 and 191 are so established, that one revolution of the gear 191 moves the locking block longitudinally on the shaft 135, a distance equal to the uniform center to center distance of the wavelength discs 117. Disposed parallel to the splined shaft 181 and suitably fastened to the motor end plate 149 is the solenoid 193, to the armature of which is fastened the yoked lever arm 195, the yoke of which engages the throat of the pinion gear 185, to impart a longitudinal motion to the gear 185 when the solenoid is energized and bring the said gear 185 into mesh with the gear 191 whenever it is necessary to move the locking block longitudinally. Diametrically opposite the locking block shaft, suitably journalled in the motor end plate 149 and the drum end plate 95 and disposed parallel to the motor armature shaft, is the shaft 197 which projects through the end plate 95, and is free to slide longitudinally. This shaft is so placed opposite to the locking block shaft in order to permit a full 180 degree rotation of the tuning drum without having the gear 199 which is fastened to the projecting end of the said shaft interfering with any of the other gears that are situated outside the drum. Fastened to the said shaft within the drum is the throated pinion gear 201. The entire shaft with the two gears is normally held by the helical spring 209 wound around the shaft 197, with the gear 199 in mesh with the idler gear 203 and the gear 201 in mesh with the idler gear 205, which is suitably journalled to the gear bracket 207 which is rigidly fastened to the drum end plate 95, in such position that gears 205 and 183 mesh. Disposed parallel to the shaft 197 and suitably fastened to the drum end plate 95 is the solenoid 211, to the armature of which is fastened the yoked lever arm 213, the yoke of which engages the throated gear 201, to impart a longitudinal motion to the shaft 197 whenever the solenoid 211, is energized, causing the gear 199 to mesh with the permanently stationary gear 215, and having the gear 201 of sufficient length to always remain in mesh with gear 205.

We shall now endeavor to explain the mechanisms leading to and associated with the wavelength selector carriages. Rigidly fastened centrally to the dielectric end plate 63 is the sleeve 103 in which revolves the hub 101 as explained previously, Figure 4. On the outside of the sleeve 103 is a rim for separating the gears 203 and 215, the gear 215 being fastened to that end of the sleeve nearest the drum end plate 95 and the gear 203 being free to rotate on that part of the sleeve nearest the dielectric end plate 63. Located radially in the rim of the said sleeve is the hole 217 in line with the hole 219 in the dielectric sides 69 and 71, to allow the passage of a screw-driver when fastening the unit to a radio receiving set tuning condenser when the tuning drum is rotated to initial or neutral stop position which brings the set-screw 221 in the hub 101 Figures 4—36, in line with the holes 217 and 219. The stationary gear 215 is the gear, about which the tuning drum is revolved by means of the gear 199 when tuning in a certain wavelength, and power is brought to the wavelength selector carriages when the gear 199 is in mesh with the idler 203, as is the normal situation. Disposed directly above the idler gear 203 and suitably mounted to the dielectric end plate 63 by means of the screw 223, the spacer 225 and the threaded flanged insert 227 is the idler gear 229 which is in mesh with the idler gear 203 and the preferably dielectric idler gear 231.

Fastened to the dielectric end plate 63 and disposed directly above the gears 203 and 229 is the bracket 233 which is suitably held displaced from the end plate 63, and through which passes the guide rod 73, journalled in the sleeve 235 and insulated from the said bracket by the dielectric sleeve 237. Fastened in the bracket 233 and the end plate 63 is the countershaft 239, on which is mounted, free to rotate, the three preferably dielectric equal size gears 231—241—243 which are held separated by the two sleeve separators 245—247. Figures 4—16—17. Suitably journalled in the dielectric end plates 61—63 and the bracket 233 in a manner similar to that of the guide rod 73, but free to rotate are the two wavelength selector carriage lead screws 249—251 which are parallel to the tuning drum axis and each displaced equally distant from the vertical center line, one on either side of the said center line, Figures 1—4—16—17. The lead screw 249 is for longitudinally moving the automatic tuning wavelength selector carriage 81 and the lead screw 251 is for longitudinally moving the remote control wavelength selector carriage 79. Adjacent to the end plate 63 and fastened to the lead screw 249 is the gear 253 which is in mesh with the gear 243. The thread pitch on the lead screw 249 and the ratio of the diameters of the gears 253 and 243 are so established, that one revolution of the gear 243 moves the wavelength selector carriage 81 a distance equal to the uniform center to center distance of the wavelength discs 117. Disposed parallel to the lead screw 249 and fastened to the bracket 233 is the solenoid 255, the armature of which is a continuation of the shaft 257 which is journalled free to rotate and move longitudinally through the bracket 233. Fastened to the end of the shaft 257 is the gear 259, and separated from this gear by a distance approximately equal to the length of the spacer 247 is fastened to the said shaft the gear 261 of the same size as gear 259. Normally the gears 259 and 261 are held by a helical spring acting on the end of the armature shaft 257 within the solenoid 255 with the gear 259 adjacent to the space between the gears 231 and 243, and the gear 261 adjacent to the space between the gears 231 and 241, but on energizing the solenoid 255 the gears 259 and 261 are brought into mesh with the gears 243 and 231 respectively, and thus power is transmitted to the automatic wavelength selector carriage 81. A similar system is used to move the remote control wavelength selector carriage longitudinally. This comprises a solenoid 263, fastened to the bracket 233 and parallel to the lead screw 251, the armature of which is a continuation of the shaft 265, journalled free to rotate and move longitudinally through the bracket 233. Fastened to the end of the said shaft is the gear 267 and separated from this gear by a distance approximately equal to the length of the spacer 245 is fastened to the said shaft the gear 269 of the same size as gear 267. Normally the gears 267 and 269 are held by a helical spring acting on the end of the armature shaft 265 within the solenoid 263, with the gear 267 adjacent to the space between the gears 231 and 243 and the gear 269 adjacent to the space between the gears 231 and 241, but on energizing the solenoid 263 the gears 267 and 269 are brought into mesh with the gears 231 and 241 respectively, and thus power is transmitted to the remote control wavelength selector carriage 79, through the gear 271 which is in mesh with the gear 241, adjacent to the bracket and fastened to the lead screw 251. The thread pitch on the lead screw 251 and the ratio of the diameters of the gears 271 and 241 are so established that one revolution of the gear 241 moves the wavelenth selector carriage 79 a distance equal to the uniform center to center distance of the wavelenth discs 117.

Inasmuch as both the automatic tuning, wavelength selector carriage 81 and the remote control wavelength selector carriage 79 with their associated mechanisms are constructed identically, a description of both can be made simultaneously with reference to Figures 1—4—12—13. Concentric with the tuning drum, lying in a plane parallel to the wavelength cams or discs, and longitudinally parallel displaceable with relation to the tuning drum axis are the substantially semicircular shaped wavelength selector carriages 79 and 81 which are suitably mounted on the three guide rods 73—75—77 and being free to be moved longitudinally, the rod 73 being journalled directly in the selector carriages but the rods 75 and 77 being journalled in the sleeves 273 which are insulated from the wavelength selector carriages by the insulating sleeves 225. On one side of these carriages are pivoted the substantially L shaped wavelenth selector arms 277 by means of the pivots 279 which are fastened to the wavelength selector carriages. Fastened to the lower extremities of the said selector arms and substantially adjacent to the guide rods 75 and 77 are the automatic wavelength selector arm switches 281 which are insulated from the selector carriages, and the said arms by the sleeve insulators 283. These switches are fastened to the selector arms by wrapping them around reduced cross sections of the said arms, Figures 14—15, the cross section at the extremities being greater than that nearer the pivot 279 to prevent the switch 281 from sliding off. An integral part of the said switches, are the rectangular projections 285 on the faces toward the wavelength discs of the substantially U shaped spring section; these projections 285 being disposed diametrically across the tuning drum. Extending centrally downward into the U shaped section are the neutralizing switch leaves 287. The contacts mounted on the said switches will be taken up in the discussion of the electrical circuit which follows later. Mounted on the other side of the wavelength selector carriages are the substantially triangular shaped dielectric blocks 289 in which are fastened the sleeves 291 journalled to the guide rod 73 to obtain a larger bearing surface for the wavelength selector carriages. Directly below the guide rod 73 and fastened in the dielectric blocks are the solenoids 293 and 295, the solenoid 293 being mounted in the remote control wavelength carriage dielectric block 289 and the solenoid 295 being mounted in the automatic tuning wavelength selector carriage dielectric block 289. On the outer end of the armature of each of the said solenoids is the cone 297 against which, the short legs of the L shaped wavelength selector arms rest. The L shape of the wavelength selector arms being necessary to allow the passage of the wavelength selector carriage lead screws. Normally, when either of the said solenoids is not energized, the cone 297 is pushed into the clearance recess 299 in the wavelength selector carriage, by the normal action of the helical springs 301 which are fastened to the wavelength selector arms 277 and the studs 303, the studs 303 being rigidly fastened in the wavelength selector carriages 79 and 81. The normal action of the springs 301 separate the rectangular projections 285 from contact with the wavelength discs 117 and at the same time the neutralizing switch leaves 287 are held centrally located with respect to the U shaped sections of the switches 281 by means of the studs 305 which are fastened in the wavelength selector carriages 79 and 81. Threaded to the lead screw 251 is the sleeve 307 which is fastened in the insulating sleeve 309 which in turn is fastened in the remote control wavelength selector carriage 79 and the associated dielectric block 289 Figures 12—13, and concentric with the lead screw 249 is the clearance hole 311, in the said wavelength selector carriage 79 and the associated dielectric block 289 to allow rotation of the lead screw 249 without causing motion of the remote control wavelength selector carriage. The automatic tuning wavelength selector carriage is similarly threaded to the lead screw 249 with the said clearance hole concentric with the lead screw 251.

Disposed above the wavelength discs 117, slightly displaced to one side of the vertical center line of the tuning drum and parallel to the axis of the tuning drum is the zero retaining spring bar 313 to which are fastened the substantially hairpin shaped zero retaining springs 315 each having a V shaped bend in the lower leg of the hairpin. These V shaped bends engage in the slots 118 in the wavelength discs 117 and retain all of the discs that are not clamped to the tuning drum, at their zero position even though the drum is turned. The said bar 313 is fastened at one end to the projecting lug 317 which is an integral part of the bracket 233, and at the other end to the transverse brace 319 which is fastened to the dielectric side plates 65 and 67. The timing mechanism for starting and stopping the operation of the radio receiving set and for setting into operation the automatic tuning mechanism at the proper time to tune in the pre-selected wavelength, will be described hereafter.

Suitably mounted, concentric with the tuning drum and longitudinally displaced with respect to the tuning drum mounting bracket 113, by means of the bracket 321, is a self-starting electric clock motor and mechanism 323, Figures 1—4—20—21, the minute hand shaft 325 of which projects axially with respect to the tuning drum, to the front dielectric plate 61. Fastened to the electric clock mechanism frame is the substantially circular switch mounting plate 327 to which is held parallel displaced by suitable separators, another similar substantially circular switch mounting plate 329. Coupled by any suitable means to the hour hand shaft of the electric clock is the gear 331 which is fastened to the end of the hour hand sleeve shaft 333 which is suitably journalled in the plate 329 and also projects to the front panel 61, and through which, suitably journalled and free to rotate is the minute hand shaft 325. Fastened to the hour hand sleeve 333 and adjacent to the plate 329 is the substantially cup shaped dielectric switch mount 335 which has an internal projecting boss on which are suitably mounted, free from rotation the five commutator rings 337 which are suitably insulated, from each other and the plate 329, by the ring insulators 339, Figures 4—8—9—10. Longitudinally displaced along the sleeve shaft 333 parallel to the dielectric cup 315 and held separated from the said cup by the sleeve 341 is the dielectric circular disc 343 which is free to rotate on the said sleeve shaft 333, Figures 4—8. Fastened to the said dielectric disc 343 is the shouldered sleeve 345 which is held by riveting the ends of the four projecting tails of the said sleeve in the four provided countersunk holes 347 of the said dielectric disc, the riveted head being sunk deep enough to provide insulation value. Mounted on the said sleeve, free to rotate between the dielectric disc 343 and the shoulder of the said sleeve is another dielectric disc 349 of substantially the same outside diameter as the disc 343. Concentrically fastened to the sleeve 345 on the other end, nearest the dielectric cup 335 is the stopping time cam which is a substantially ring shaped cup cam 351; the cam surface being provided by the sides of the cup extending substantially 180 degrees around, Figures 8—9—10. Suitably fastened to the dielectric disc 349 by means of the rivets 353 is the starting time cam which is another ring shaped cup cam 355 constructed basically the same as the stopping time cup cam 351, with the insulating ring 357 between the said cam and the said disc.

Centrally located and suitably fastened in the front dielectric end plate 61 is the ring 359, the outside of which is beaded, to hold the observing window 361 from falling out, and suitably fastened in the ring 359 and paralled to the end plate 61 is the clock face 363 between which and the observing window 361 is the ring separator 365, Figures 1—4—8—9—10—11, and centrally located in the clock face and inwardly disposed is a hub in which is journalled the shaft sleeve 333, free to rotate. Fastened to the dielectric disc 343, is the substantially L section ring or stopping time disc 367 which is held to the disc 343 by means of screws passing through the holes 369 in the disc 367 and threaded in corresponding holes 371 in the dielectric disc 343. The stopping time disc is held separated from the back of the clock face by means of a raised ridge which is an integral part of the stopping time disc 367, Figures 4—8. Disposed between the stopping time disc 367 and the dielectric disc 343 is the starting time disc 373 which is substantially cup shaped and in the cup of which, lies the stopping time disc. This starting time disc is fastened to the dielectric disc 349 by means of a projecting tail which passes through a substantially semicircular slot 375 in the dielectric disc 343 and enters a countersunk hole 377 in the dielectric disc 349 where it is riveted Figures 4—8. Projecting radially outwards between the rear edges of the starting and stopping time cams, and the switch mounting plate 329, and an integral part of the dielectric cup 335 is the dielectric switch mount 379 on which is mounted the starting and stopping time switch spring 381, Figures 4—9—10. The flat switch spring 381 is mounted perpendicular to the axis of the tuning drum and its normal action is to spring inward, toward the said axis. On the other end of the spring 381 are contact points which will be explained later and these contacts make with other contact points, which are fastened to the dielectric switch contact mount 383 which in turn is an integral part of the dielectric cup 335. Fastened on opposite faces of the flat switch spring 381 are the bent springs 385 and 387 each of which normally assume a distended V shaped position with relation to the flat spring 381. These springs 385 and 387 have substantially L shaped projections which ride between the starting and stopping time cam faces 355 and 351. The operation of this starting and stopping time switch will be described hereinafter.

When the corresponding ends of the starting and stopping time cams 355 and 351 lie on the same radial line a semicircular double faced groove is formed. When the springs 385 and 387 are carried into this groove due to the fact that they rotate with the hour hand sleeve shaft 333, the flat switch spring 381 is forced to assume a neutral position with the contacts on the ends of the said flat spring making no contact with their associated contact points, and when the springs 385 and 387 reach the end of the cam faces, both springs 385 and 387 distend and since neither is in contact with a cam surface, the normal action of the flat switch spring 381 causes the entire assembly to spring inward, toward the tuning drum axis, thus making associated contacts. However, in the normal operation of the automatic tuner, the stopping time cam 351 is advanced ahead of the starting time cam 355 in a clockwise direction when viewed from the front of the invention; the arc of advance being proportional to the time interval that the invention is set up for. Since the trailing ends of the springs 385 and 387 terminate on a radial line that lies in that plane which passes through the hour hand of the clock and the axis of the hour hand shaft, it is manifest that when the spring 385 reaches the end of the starting time cam surface it will assume its normal distended position and the normal distending action of the spring 387 will cause the entire switch assembly to depart from the axis of the tuning drum and cause that set of contact points on the upper face of the flat switch spring 381 to make with their associated contact points. When the spring 387 reaches the end of the stopping time cam surface it distends itself and the normal action of the flat switch spring 381 causes the entire switch assembly to move inward toward the axis of the tuning drum, thus breaking the contacts mentioned above and making new ones. It is manifest that the relative restoring forces of the said springs must be established to achieve the result desired. Hour numerals are placed on the front face of the starting time disc 373, and in particular they are placed on the flat surface of the cupped edge of the said disc, and hour numerals are also placed on the flat front surface of the stopping time disc 367 outside of the raised ridge of the said disc, Figure 8. These numerals are visible through the suitable holes 389 and 391 in the clock face, Figure 11. Placed on the front face of the strip of metal of the clock face between the said holes are four equally spaced lines, each line being separated from the next one by an angle equal to fifteen minutes. Hence, by noting which line the hour numerals on the starting and stopping time discs are in line with, an observer immediately knows the limits of the time interval set up for automatic tuning.

It is manifest that all of the elements of the timing mechanism are so arranged with reference to the clock face and hour hand of the clock to achieve these results, and the hour hand 393 is mounted on the end of the hour hand sleeve shaft 333 and the minute hand 395 is fastened on the end of the minute hand shaft 325, and these hands together with the numeraled clock face are visible through the window 361. Concentrically mounted on the circular dielectric discs 343 and 349 are the ring gears 397 and 399 respectively, each having forty-eight teeth and each tooth representing fifteen minutes. Through a suitable gear train which will be described later, meshing with the ring gear 397, the starting time is adjusted. Although the gear 397 is directly fastened to the dielectric disc 343 which is associated with the stopping time mechanism, the starting time is adjusted in the following manner. When the ring gear 397 is rotated in a counterclockwise direction relative to the hour hand of the clock, the stopping time cam 351 and the stopping time disc 367 also rotate counterclockwise with the said gear, and the projecting tail of the starting time disc 373 remains stationary until the end of the substantially semicircular slot 375 in the dielectric disc 343 encounters the said tail. This action brings the starting and stopping time disc 373 and 367 to the same hour reading as well as causing corresponding ends of the starting and stopping time cams 355 and 351 to fall on the same radial line. Continued counterclockwise rotation of the said ring gear then causes the starting time disc to rotate counterclockwise, which action is carried on until the starting time is adjusted to that time for which the radio receiving set is scheduled to begin automatic tuning. The automatic advance of the stopping time as a series of wavelength settings are adjusted into the automatic tuner will be described together with the set-up button or switch. Although the invention, as we illustrate and describe it herein allows automatic radio tuning for a period of only six hours, capable of being preselected and entered into the invention twelve hours in advance, it is manifest, that these ranges can be increased to any desired value by increasing the capacity of the tuning drum and/or by inserting the proper gear reduction between the hour hand sleeve shaft 333 and the dielectric starting and stopping switch mount cup 335, together with suitable changes in the number of numerals placed on the starting and stopping time discs 373 and 367 and the number of teeth in the ring gears 397 and 399 and so forth without going beyond the scope of our invention.

We shall now describe the fifteen minute interval switch that is associated with the time clock mechanism. It is often desired to change a radio program every fifteen minutes or multiple of fifteen minutes since the shortest radio program is usually fifteen minutes long and a new wavelength setting may be desired at the expiration of that time. It is therefore necessary to provide means to automatically accomplish this change every fifteen minutes if such a change is desired. Fastened to the minute hand shaft 325 between the switch mounting plates 327 and 329 is the fifteen minute interval cam 401, Figures 4—20—21, which has four substantially V shaped notches cut in the periphery of the cam exactly 90 degrees apart, and since the minute hand shaft makes one complete revolution per hour, the notches are fifteen minutes apart. Suitably pivoted vertically with respect to the front of the invention, between and near the periphery of the switch mounting plates 327 and 329 is the fifteen minute switch lever 403 which has as an integral part of the said lever a substantially V shaped projection which fits into the notches of the fifteen minute interval cam 401 when the said cam is rotated to the proper position. One side of the V notch and the V projection mentioned above, lies in a plane perpendicular to the switch lever 403 and passing through the axis of the cam. The said cam is rotated by the clock mechanism in such a direction as to cause the instant making of the contact points on the free end of the switch lever 403 with their associated contact points by the dropping of the lever 403 toward the axis of the cam along the straight side of the said grooves at exactly every fifteen minutes; which time is measured from the hour, and the other side of the notches is at such an angle to allow the said cam to rotate. This instant dropping of the switch lever 403 is caused by the normal action of the helical spring 405 which is fastened to the said switch lever and the block 407. The block 407 is suitably mounted between the switch mounting discs 327 and 329 and on the said block are suitable mounted the contact points associated with the contact points of the switch lever 403. Located below the fifteen minute cam is the electromagnet 409, which is mounted on a suitable bracket 411, the axis of the said electromagnet being preferably vertical and the bracket 411 being fastened to the dielectric side plates 69 and 71. Suitably pivoted between the switch mounting plates 327 and 329 is the essentially three legged fork-shaped lever 413, the lower outer leg of which is actuated by the said electromagnet, and each of these legs lie in a separate plane, the planes being parallel displaced. Located approximately midway between the pivot and the V shaped projection on the fifteen minute switch lever 403 and on the same face of the lever as the V projection is a substantially double V shaped projection which is an integral part of the said lever. The bottom of the valley formed by the junction of the two vees is raised from the face of the said lever of which it is a part, and the valley is for the purpose of accommodating the free end of the middle leg of the forked lever 413, when the contacts on the free end of the lever 403 are desired to be broken. Arranged in a circle concentric with the axis of the fifteen minute interval cam are the four projecting pins 415 which are spaced 90 degrees apart and fastened to the said cam between the V shaped notches.

Normally, the lower leg of the forked lever 413 is separated from the electromagnet 409, and the middle leg of the said forked lever is out of contact with its associated notch on the lever 403 and the V projection of the lever 403 rides on the periphery of the cam 401. As the cam revolves, the contacts points on the lever 403 make contact with their stationary associated contacts on the block 407 at the proper time. These contacts remain closed as the cam continues to rotate, and the middle leg of the forked lever is now in contact with one of the outer faces of the double V projection of the lever 403. After the cycle of events, resulting from the closing of the above contacts is completed, the electromagnet 409 is energized, and this action, causes the middle leg of the forked lever to separate the contacts on the lever 403 and retain them so separated after the end of the said leg has dropped into its associated valley or notch of the lever 403, as well as closes the contacts that are mounted on the lower leg of the forked lever and the electromagnet 409. As the said cam continues to rotate further, one of the projecting pins 415 comes in contact with the upper leg of the forked lever, and further rotation of the cam pushes against the said upper leg, which action causes the middle leg of the forked lever to be withdrawn from its associated notch; so that the V projection of the lever 403 can again rest against the cam periphery for another cycle as just explained. It is manifest that the projecting pins 415 must be so placed between the notches of the cam 401 that the releasing of the lever 403 by the middle leg of the forked lever 413 will not allow the contacts on the free end of the lever 403 to again make contact by using the same cam notch that it has just completed using.

Suitably mounted to an insulating block, which is fastened to the switch mounting plate 329 and projects into the cup of the dielectric cup 335, and insulated from each other are the five contact fingers 417, which rest on the five commutator rings 337, and to which the electrical leads are brought for the starting and stopping time switch contact points. The set-up button or switch and the associated mechanism will be described hereinafter.

In the descriptions which follow, we shall make use of such terms as "located in the front left corner," "located in the rear right corner," located in the front lower corner," etc., and by these terms we shall mean the stated corners in the box formed by the dielectric end plates 61 and 63 and the dielectric side plates 65—67—69—71 when we view the box in a direction from the front plate 61 to the rear plate 63, or when viewing the invention as in Figures 1—2—3. Located in the front left corner is the set-up button or switch mechanism which contains, the means for actuating the locking block when inserting a wavelength setting into the tuning drum, the means for setting the starting time and the means for automatically advancing the stopping time as each fifteen minute period is inserted into the tuning drum Figures 26—27. Projecting through and journalled in the front dielectric plate 61 and parallel to the axis of the tuning drum and the dielectric side plates 69 and 71 is the set-up switch shaft 419 to which is fastened outside the casing the dielectric button or knob 421 Figures 1—2—3 for manual operation. Fastened to the side plate 71 is the mounting block 423 in which is journalled free to rotate and move longitudinally, the set-up switch shaft 419. Fastened to the said shaft between the said mounting block and the front plate 61 is the spur gear 425 which has a large concentric hub 427, and wound around the said shaft, between the said mounting block and the said gear hub, is the helical spring 429, the normal action of which is to push the set-up button 421 outward after it has been depressed. Fastened to the said shaft between the gear 425 and the front plate 61 is the cone 430, the largest diameter of which extends to the said gear. Pivoted to a suitable projection of the mounting block 423 and located above the said block when we consider the side plate 69 as horizontal, is the set-up button trigger switch spring 431, Figure 28 which substantially consists of a channel shaped piece of spring metal, from which; the sides have been removed on equal distance from one end; two parallel longitudinal slots have been cut in the web of the channel from one end equally distant but leaving enough metal at the other end to hold the construction together; the entire complete channeled part being left straight and the remaining part being bent opposite to the channeled part to form substantially a U, the flat leg 431—A of the U being much shorter than the channel shaped leg; the central strip being bent substantnially S shaped so that the arch 431—B projects up through the space formed by the slots mentioned above; and the end of the S having a step 431—C. The plane of the S shaped portion lying in the vertical plane of the set-up switch shaft axis, when again considering the side plate 69 as horizontal and the step 431—C normally rests on the gear hub 427. Suitably pivoted at one end to the side plate 65 and perpendicular to the axis of the set-up switch shaft is the set-up button switch spring armature bar 433, Figures 26—27—29, which normally rests on the arch 431B of the set-up button trigger switch spring, and the front edge of the said armature bar lying beneath the short leg 431—A of the said switch spring with the proper clearance which will be accounted for as this description progresses. Suitably pivoted to the end of the projecting boss 435 of the armature bar 433 is the pawl lever 437, one end of which engages a tooth space of the stopping time ring gear 397 and the other end of which, projects below the set-up switch shaft with the correct edge of the said lever resting against that part of the set-up switch shaft which is between the cone 431 and the front plate 61. The set-up button trigger switch spring 431 is normally held down against the boss 439 which is an integral part of the mounting block 423, by the normal action of the helical spring 441, one end of which is fastened to the pin 443 which is fastened across the said switch spring, and the other end of which is fastened to the said mounting block. The set-up button switch spring armature bar 433 is normally held down against the arch 431—B by the normal action of the flat spring 445 one end of which is fastened to the side plate 69 and the free end of which rests against the upper face of the said armature bar. On the underside of the said armature bar is a contact point which makes with its associated contact point on the bent flat spring 447, when the said armature bar is in its normal position. Suitably fastened to the side plate 69 is the electromagnet 449 which actuates the armature bar 433, and suitably mounted on the upper face of the said armature bar at the free end, adjacent to the projecting boss 435 of the said armature bar are contact points which make with their associated contact points which are mounted on the flat spring 451 when the said armature bar is moved toward the electromagnet 449, and the flat spring 451 Figure 30 is suitably fastened to the side plate 69. Suitably fastened to the side plate 69 is the gear bracket 453, on which are suitably journalled free to rotate, the idler spur gears 455 and 457 both in mesh, and the gear 457 being in mesh with the ring gear 397. The spur gear 425 is out of mesh with the gear 455 when the set-up switch shaft 419 is in its normal position, which position is retained against the force of the helical spring 429 by means of a ball 459 which is set in a hole in the mounting block 423 and which engages a groove 461 in the set-up switch shaft 419, by the normal action of the helical spring 463, Figure 26. However, the control knob or button 421 can be pulled out manually against the clutch action of the ball 459. We shall now describe the operation of the set-up button or switch and the associated mechanism.

When the set-up button or knob 421 is manually pulled outward from its normal position the cone 430 causes the pawl lever 437 to disengage from the tooth spaces of the ring gear 397 to allow counterclockwise rotation of the ring gear 397, and the gear 425 on the set-up switch shaft 419 is caused to mesh with the idler gear 455, whereupon, a clockwise rotation of the knob 421 causes the ring gear 397 to rotate counterclockwise relative to the hour hand of the clock and the starting time disc 373 can be adjusted to the desired hour and the stopping time disc 367 will also register the same time, as previously explained. The knob 421 is depressed when it is desired to lock a selected wavelenth into the tuning drum and this action, disengages the gear 425 from the idler gear 455 and allows the pawl lever 437 to re-engage a tooth space of the ring gear 397. Release of the said knob allows the return of the knob 421 to its normal position where it is retained by the ball 459. Also, when the knob 421 is depressed beyond its normal position, the hub 427 of the gear 425 pushes against the step 431—C and causes the set-up button trigger switch spring 431 to bear down on the boss 439. Continued depression of knob 421 then causes the central section of the said trigger switch spring to flex at the bow 431—D so that the arch 431—B pushes against the bottom of the armature bar 433, whereupon the contact points on the upper face of the free end of the said bar are caused to make contact with their associated contacts on the flat spring 451 and the said bar then meets the under side of the short leg 431—A of the said trigger switch spring and due to the spring action of the bent flat spring 447, the contact on this spring has followed the armature bar and still retains its connection. However, when the locking block mechanism within the tuning drum begins to operate because of the contacts, on the upper face of the armature bar 433 and those on the flat spring 451, the electromagnet 449 is energized, and this action, causes the armature bar to be drawn closer to the said electromagnet, retaining the upper contact but breaking that between the under face of the said armature bar and the bent flat spring 447. The motion of the armature bar 433 due to the energizing of the electromagnet 449 also causes the lifting of the entire trigger switch spring 431 because of the force exerted by the said armature bar on the under side of the short leg 431—A of the said trigger switch spring, and the step 431—C is drawn free from the hub 427, whereupon, the strain in the bow 431—D is relieved, which causes the step 431—C to displace toward the gear 425, and further, the motion of the said armature bar also causes the pawl lever 437 to rotate the stopping time disc and its associated cam through an angle equal to fifteen minutes of time. Hence, when the armature bar is released from the action of the electromagnet the said bar returns to its normal position because of the spring 445, thus breaking the contacts on the upper face of the said armature bar and making the lower one, and the step 431—C of the trigger switch spring cannot be caught by the hub 427 until the knob 421 is released and retracts to its normal position whereupon the step 431—C is regained by the hub 427. The use of this switch therefore insures the locking of only one wavelength disc at a time as well as advancing the stopping time disc only fifteen minutes of time for each wavelength disc locked to the tuning drum for automatic tuning. Fastened to the gear bracket 453 are the time-disc retaining springs 465, Figures 27—37, which are essentially a flat double spring having a corrugation on both of the free ends which engages with the tooth spaces of the ring gears 397 and 399, one section of the said spring engaging each of the said gears, to prevent any accidental motion of the starting and stopping time cams, and to retain the starting and stopping times accurately.

We have provided means for automatically unlocking all of the automatic tuning wavelength discs at the expiration of the time interval set-up for, as well as means for returning all of the said discs to initial or neutral stop position. We shall now describe this mechanism, omitting such electrical detail as will be considered in the electrical explanation which follows later.

Located in the left hand trough formed by the intersection of the dielectric side plates 65 and 69 and in particular, located in that region determined by the intersection of the plane of the drum end ring 93 and the said trough, is the neutral stop position return mechanism, Figures 31—32. Lying in a plane parallel displaced forward with relation to the plane of the drum end ring 93 is the substantially V shaped lever 467 which is suitably pivoted at its bottom vertex between the bearing standards 469, and having the right-hand leg of the said lever in an essentially vertical position, with the left-hand leg being of sufficient length to cut off the projection of the set-up switch shaft 419 if this shaft were so projected and if the said leg of the lever were swung through a sufficient arc about its pivot axis. Fastened in the end ring 93 and parallel to the tuning drum axis and lying in the plane of the tuning drum axis and the locking block shaft 135 is the projecting pin 471, which moves the free end of the right leg of the said lever toward the axis of the tuning drum by acting against the provided sloped edge when the said drum is rotated to the initial or neutral stop position, that is when the tuning drum is rotated counterclockwise in Figure 31. On the inside edge and adjacent to the sloped free end of the right leg of the said lever are two steps 467—A and 467—B which advance upward and toward the vertical plane passing through the tuning drum axis. Pivoted between the brackets 373 which are fastened to the side plate 69 is the neutral stop position armature bar 475 which normally rests on the step 467—A when the invention is ready to be set-up for an automatic tuning program, and in this position, all of the contacts mounted on the said armature bar are neutralized between their associated contacts, and the outside edge of the left leg of the V is very slightly displaced from the center line of the set-up switch shaft 419 toward the axis of the tuning drum. The set-up switch shaft 419 has a cone shaped end, the point of which ends at the plane of the lever 467. When the said armature bar is in its neutral position, the set-up switch button or knob 421 can be depressed, which action causes the cone end of the set-up switch shaft 419 to rotate the entire lever 467 so that the neutral stop position armature bar 475 can be swung downward past the step 467—A by the helical spring 477, one end of which is fastened to the said armature bar and the other end of which is fastened to the side plate 69, thus closing the contacts on the lower face of the said armature bar with their associated contacts on the spring contact bracket 479. It is manifest that this action occurs only when the first wavelength desired is locked in the tuning drum since the position assumed by the armature bar 475 because of this operation, remains in this position until stopping time has been reached by the electric clock. When stopping time is reached the tuning drum is caused to revolve in the clockwise direction, after the wave-length discs have been unclamped and other operations which will be explained later have occurred, until, the projecting pin 481, which is suitably fastened on the periphery of the tuning drum to allow 180 degree rotation from the initial or neutral stop position, causes the contact point on the switch spring 483 which is normally in contact with the contact point on the switch spring 485 to break this and remake contact with the contact point on the switch spring 487, which action energizes the electromagnet 489. The above switch springs and the electromagnet are suitably fastened to the side plate 65, with the axis of the electromagnet being substantially vertical with respect to the armature bar 475. The energized electromanget attracts the said armature bar, which breaks the contacts one the lower face of the armature bar from their associated contacts on the bracket 479 and causes the contacts on the upper face of the armature bar to make with their associated contacts on the spring contact bracket 491, and due to the normal action of the helical spring 493, one end of which is fastened to the left leg of the lever 467 and the other end to the side plate 69, the said armature bar is now held by the step 467—B, thus retaining the contacts now made even though the connection between the contacts on the switch springs 483 and 487 are almost immediately broken. With the armature bar held by the step 467—B the tuning drum is now reversed and rotated in the counterclockwise direction during which the set-up button 421 cannot be depressed since the free end of left leg of the lever 467 now blocks the path of the set-up switch shaft 419, the bracket 495 being fastened to the side plate 69 and provided to prevent bending of the lever 467, should the set-up knob 421 now be depressed. The said drum continues to rotate counterclockwise until the pin 471 displaces the lever 467 and allows the armature bar 475 to assume its neutral position on the step 467—A, thus stopping the rotation of the tuning drum at its initial or neutral position. The back and forth rotation of the tuning drum as just described causes the zero bar 121 on the tuning drum to sweep through 180 degrees, which operation puts all of the notches 118 of the automatic tuner wavelength discs 117 in line and causes the said notches to be engaged by the zero retaining springs 315; and the initial or neutral stop position in our embodiment of the invention which we show in the drawings, is when the zero bar 121 is at 90 degrees in the clockwise direction from the vertical.

We shall now describe the volume control means and the means provided for adjusting the clock hands 393 and 395 to the proper hour in the event of the electric clock stopping. Located in the region of the rear right-hand corner is the volume control means which is manually operated by the shaft 497, Figures 1—22—23. The said shaft being parallel to the tuning drum axis and suitably journalled, free to rotate and move longitudinally, in the front dielectric plate 61. Suitably fastened to the dielectric side plate 71 and disposed parallel to the rear dielectric end plate 63 is the volume control or rheostat bracket 499, in which the said shaft is also suitably journalled, and on the end of the said shaft is fastened the spur gear 501 which is adjacent to the end plate 63 when the said shaft is in its normal position. Suitably mounted on that face of the bracket 499 that is toward the end plate 63 is the rheostat or other rotatable radio receiving set volume control means 503, the axis of which is parallel to the shaft 497. Fastened to the opposite face of the bracket 499 is the volume control solenoid 505, the armature 507 of which passes through the bracket 499 suitably journalled, and also passes through the sleeve shaft of the said rheostat, and to the end of the said armature shaft 507 is fastened the spur gear 509 which is, adjacent to the end plate 63 and in mesh with the gear 501 when the said armature shaft is in its normal position; which position is obtained by a spring acting against that end of the armature shaft 507 within the said solenoid when the solenoid is not energized. The said sleeve shaft of the rheostat which is an integral part of the movable arm of the rheostat is suitably keyed to the armature shaft 507, to allow longitudinal motion of the said armature shaft relative to the said rheostat movable arm and at the same time cause rotation of the said rheostat sleeve shaft with the said armature shaft. Fastened to the dielectric end plate 63 is the stud 511 to which is suitably journalled, free to rotate, the idler spur gear 513, the plane of which, is disposed parallel to the end plate 63 and adjacent to the space between the gear 509 and the rheostat 503 when the solenoid 505 is not energized. The gear 513 is always in mesh with the idler gear 203 and is so disposed along the tooth face of the idler gear 203 that rotation of the tuning drum power gear 199 around the periphery of the idler gear 203 is not prevented.

The energizing of the volume control solenoid is initiated from the remote control unit, and when the said solenoid is energized, the gear 509 disengages from the gear 501 and meshes with the idler gear 513 so that rotation of the idler gear 203 by the action of the electric motor within the tuning drum causes the rheostat 503 to vary the volume of the radio receiving set as desired. Manual control of volume is affected by turning the dielectric volume control knob 515, Figures 1—2—3, which is fastened to the projecting end of the shaft 497, and the volume control knob 515 and the set-up button or knob 421 are identical and symmetrically located on the front dielectric plate 61 with relation to the vertical center line in order to establish a pleasing appearance.

The means for setting the electric clock hands 393 and 395 to the correct time in the event of the electric clock stoppings consists of a simple gear train Figures 1—24—25. Fastened to the side plate 71 adjacent in the fifteen minute interval switch mounting plates 327 and 329 are the two parallel disposed gear mounting brackets 517 and 519, in which is suitably journalled the volume control shaft 497. Suitably mounted between these brackets free to rotate only and adjacent to the bracket 517 are the three idler gears 521, 523 and 525 all in mesh, forming a continuous train, with the three said gears forming a substantial V shape so that the tuning scale mounting bracket can revolve to its maximum position. The gear 525 is suitably coupled by any suitable means to the minute and hour hand shafts of the electric clock 323, so that rotation of the gear 525 will rotate the clock hands 393 and 395 to the proper time reading when the invention is initially set into operation or should the said electric clock stop at any time. Fastened to the shaft 497, adjacent to the bracket 519, when the said shaft is in its normal position is the gear 527, which is normally disengaged from the gear 521, and fastened to the said shaft on the opposite side of the bracket 519 is the collar 529, against which the helical spring 531 which is wound around the said shaft between the bracket 519 and the said collar acts to hold the shaft 497 in its normal position. When the knob 515 is manually pulled outward from the end plate 61, the gear 527 engages the gear 521, and the gear 501 associated with the volume control disengages from the rheostat control gear 509, whereupon rotation of the knob 515 causes the hour and minute hands 393 and 395 to rotate as explained above, without affecting the volume control, and release of the knob 515 causes the shaft 497 to assume its normal position because of the normal action of the helical spring 531.

Manual control of wavelength tuning is accomplished at any time by simply rotating the tuning drum. Suitably journalled in the front plate 61 and the tuning drum mounting bracket 113 and disposed parallel to the tuning drum axis and vertically below the said axis is the shaft 533, Figures 1—4, to which is fastened outside the end plate 61, the dielectric tuning or wavelength setting knob 535, Figures 1—2—3, which lies adjacent to the front plate 61. Suitably mounted on the other end of said shaft is the spur gear 537, between which and the bracket 113 is the spacer 539 to prevent longitudinal motion of the said shaft. The gear 537 meshes with the ring gear 541 which is mounted concentrically around the periphery of the tuning drum end ring 93, so that manual rotation of the tuning knob 535 causes rotation of the tuning drum.

A visual tuning or wavelength scale is also provided. Suitably fastened to the tuning drum end ring 93 adjacent to the end ring projecting ear 139 is the tuning scale bracket 543 to which is fastened plane parallel to the dielectric end plate 61, the transparent ring shaped tuning scale 545 on which a wavelength scale is placed Figures 1—4. The readings of the said scale are made visible through the suitably escutcheoned hole 547 which is in the end plate 61 vertically above the tuning drum axis and above the clock face. Suitably mounted to the bracket 549 which is fastened to ring 359, and directly behind the hole 547 and the tuning scale 545 is the electric light bulb 551, which facilitates tuning scale reading, illuminates the starting and stopping time discs through the space between the clock face 363 and the starting and stopping time discs 373 and 367, as well as acts as a safety indicator which will be described in the wiring diagram description which follows later.

Located in the automatic tuner unit are various electromagnets, switches and other instrumentalities and features which will also be explained in the description of the wiring diagram.

Figure 6:
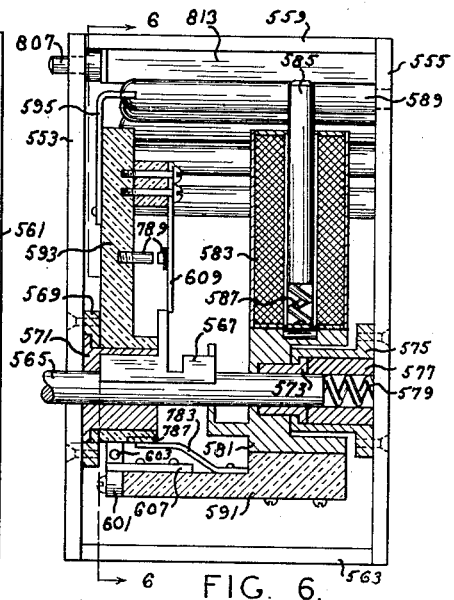
Figure 6 is a cross section taken on line 5—5 of Figure 5, or taken on line 40—40 of Figure 40, showing in detail the construction of the remote control unit.
Figure 38:
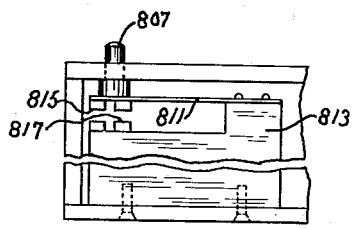
Figure 38 is a cross section taken on the line 38—38 of Figure 5, showing the construction of the volume control switches in the remote control unit.
Figure 39:
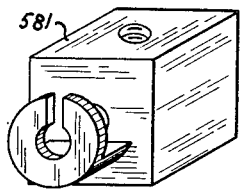
Figure 39 is an oblique view showing the construction of the solenoid mounting block in the remote control unit, and in particular the means for holding down the station selector knob for the associated instantaneous contact switch.
Figure 40:
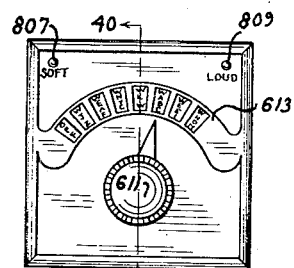
Figure 40 is a top view of the remote control box showing the station scale.
Figure 7:
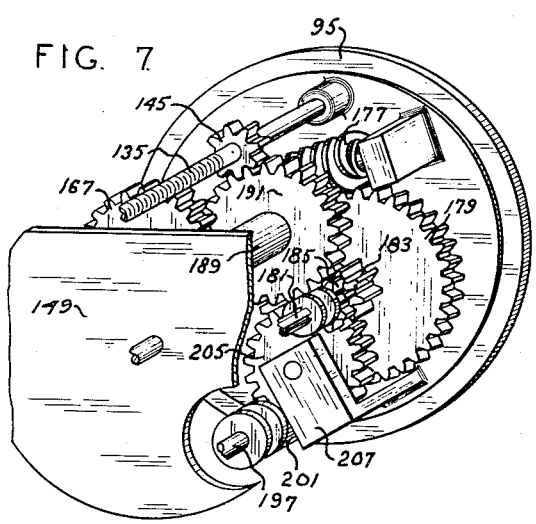
Figure 7 is an oblique view showing the arrangement of the gears within the tuning drum.

We shall now describe the remote control unit, Figures 5—6—40, which is essentially an intermittent follow-up mechanism. The remote control unit is in a box separated from the automatic tuner unit and both units are electrically connected together by a cable comprising seven wires insulated from each other. Disposed between the dielectric top plate 553 and the bottom dielectric plate 555 which are parallel to each other is the remote control unit mechanism. The said plates are held separated by the four dielectric side plates 557, 559, 561, and 563 to which they are also suitably fastened. Passing perpendicularly through the top plate 553 is the shaft 565, in which is cut a rectangular keyway to accommodate the square ended key 567. Concentric with the said shaft and fastened to the inner face of the top plate 553 is the cup shaped bearing ring 569 in which is journalled, free to rotate, the shouldered bushing 571, the cup shaped ring 569 always holding the said bushing adjacent to the top plate 553. Passing through the bushing 571 is the shaft 565 and in the bushing 571 is a keyway to accommodate also the key 567 so that longitudinal motion of the shaft 565 with relation to the bushing 571 can be obtained. Journalled free to rotate on the shaft 565 near the inner end of the said shaft is the shouldered bushing 573, the shoulder of which is journalled free to rotate in the cup shaped ring bearing 575 which is fastened to the inner face of the bottom plate 555. Disposed between the shouldered end of the bushing 573 and the bottom plate 555 is the sleeve 577, which is held in the cup of the ring bearing 575 and in which is journalled free to rotate and displace longitudinally the shaft 565. In the sleeve 577 is the helical spring 579, one end of which rests against the bottom plate and the other end of which presses against the inner end of the shaft 565. The purpose of the cup shaped ring bearing 575 and the sleeve 577 is to prevent longitudinal motion of the bushing 573. The key 567 is substantially T shaped with a square notch cut into the head of the said T adjacent to the leg of the T. The said key cannot move with relation to the shaft 565 and the normal action of the spring 579 tends to keep, that side of the T leg near which there is no notch, adjacent to the bushing 571. Fastened to the bushing 573 is the substantially cube shaped block 581, and fastened to one of the faces of the said block, perpendicular to the shaft 565, is the solenoid 583, the armature 585 of which is normally held out of the solenoid by the normal action of the helical spring 587, one end of which is suitably fastened to the base of the solenoid and the other end of which is suitably fastened to and presses against the inner end of the armature 585, and the armature cannot go out of the solenoid because of the fastened spring 587. The projecting end of the said armature engages the spaces between the nine pins 589 which are, mounted perpendicular to the bottom plate 555 in an arc concentric with the axis of the shaft 565. Fastened to that face of the block 581 that is opposite the solenoid 583 is the dielectric brush mount 591, and an integral part of the said block is a split ring which is suitably displaced parallel to the upper face of the said block, Figure 39, and the split of which engages the key 567. Fastened to the bushing 571 adjacent to the bearing ring 569 is the dielectric contact bar 593 on the top face of which is fastened the flat L shaped spring 595 the V-shaped end of which engages the spaces between the rounded ends of the pins 589, and suitably mounted on the sides of the bar 593 are the contact strips 597 and the small contact studs 599. Suitably pivoted on the top end of the dielectric brush mount 591 are the brushes 601 which normally rest one against each of the stud contacts 599. Fastened across the brushes 601 is the helical spring 603 which is suitably insulated from the said brushes by the shouldered insulating sleeves 605, and this spring tends to keep each of the brushes against its associated contact strip or stud on the bar 593. The free ends of the brushes 601 can never be separated by a distance less than the distance between the outer faces of the contact studs 599 because of the stops 607 which are fastened to the brush mount block and against which the said brushes normally rest. Displaced substantially parallel to the under face of the bar 593 and fastened to the said face is the flat spring switch 609 which normally rests against the under side of the leg of the T shaped key 567 when the shaft 565 is in its normal position. Fastened to the outer end of the shaft 565 is the control knob 611, Figure 40 on which there is an indicator which passes over a suitably escutcheoned scale 613 in which is provided a suitable background on which to mark the call letters of the remote control stations together with the "off" position Figure 40. Each of the spaces between the pins 589 represents a definite wavelengths with one of the spaces at either extremity of the arc of the said pins representing the "off" position. It is manifest that the capacity of the remote control unit can be increased by using more pins.

When a remote control station is desired, the knob 611 is depressed which action brings the notch of the key 567 into the plane of the split ring of the block 581 and the spring switch 609 now snaps to the opposite side of the leg of the T shaped key 567. The knob 611 is now rotated to the desired wavelength and the bar 593 rotates with the said knob and is held at the space between the pins 589 corresponding to the chosen wavelength by means of the spring 595. The solenoid 583 remains stationary however, while the knob 611 is rotated and the brushes 601 become displaced relative to the bar 593 such that one of the brushes 601 makes contact along its associated contact strip 597 while the other brush is held away from its associated contact strip. This causes the electric motor in the tuning drum to revolve in the proper direction so as to cause the remote control wavelength selector carriage in the automatic tuner unit to seek the proper wavelength disc, and for each wavelength disc that the said carriage passes over, the solenoid 583 is energized once and the normal action of the spring 603 causes the solenoid 583 to move one space at a time toward the bar 593. This continues until the solenoid 583 is directly under the bar 593, at which point the desired wavelength is tuned in. While the bar 593 is displaced relative to the solenoid 583, the control knob 611 cannot raise from its depressed position because of the notch in the key 567 being held by the split ring of the block 581, but when the solenoid is directly under the bar 593 the said control knob can elevate to its normal position causing an instantaneous closing and reopening to its normal position of the contact point on the spring switch 609 with its associated contact on the under face of the bar 593. Also when the solenoid 583 is directly under the bar 593, the brushes 601 make contact with their associated contact studs 599, the purpose of which will be explained in the description of the wiring diagram which we shall explain hereinafter.

In order to fully understand the wiring diagram and the operation of the automatic tuner unit and the remote control unit, we shall proceed with an example of automatic tuning, considering various alternatives and follow through the cycles of operation from the initial attaching of the invention to a radio receiving set to the final completion of an automatically tuned series of wavelengths. We shall commence with the locking block 143 ready to clamp the first wavelength disc nearest the drum end ring 93 to the tuning drum so that all of the wavelength discs are unclamped, the zero retaining springs 315 engaging all of the notches 118 in the wavelength discs 117 the wavelength selector arms of the remote control wavelength selector carriage 79 over the said first wavelength disc, the wavelength selector arms of the automatic tuner wavelength selector carriage 81 over the ninth disc slightly nearer the eighth disc from the drum end ring 93, Figures 1—4, and the remote control unit at the "off" position with the solenoid 583 directly under the bar 593, Figures 5—6—40, etc., and we shall show how this initial condition is finally obtained as the starting position for a new set-up. In our embodiment of the invention we shall speak of definite directions of rotation and longitudinal motion, but it is to be understood that we do not limit ourselves to these directions nor do we limit ourselves to the definite order of the cycles of operation which we shall speak of. We shall limit the installation of the invention to a radio receiving set having the shaft of the turning condenser or other rotatable tuning element, perpendicular to, and projecting through, the front panel of the said receiving set since our embodiment of the invention as we prefer to show it is particularly well adapted to such a receiver, but it is manifest that the invention can be incorporated with other designs of radio receiving sets without exceeding the scope of our invention.

The automatic tuner unit is attached to the said tuning condenser shaft of the radio receiving set by rotating the tuning drum to the initial or neutral stop position by means of the knob 535 and revolving the said tuning condenser shaft 615 to the corresponding 180 degree position, whereupon the automatic tuner is directly coupled axially to the said condenser shaft by tightening the set-screw 221 to the said shaft, and the invention is suitably fastened to the front panel of the radio receiving set, Figures 1—2—4—36 by screws passing through the said front panel and threaded in the dielectric rear end plate 63, and electric power is suitably brought to the automatic tuner through the leads 617, Figure 47.

We shall assume that a definite series of seven frequently used wavelengths have been decided upon for remote control operation. These are recorded on the remote control unit on the escutcheon provided as previously explained, Figure 40, the recording starting adjacent to the "off" position. The "off" position is locked into the tuning drum by having the said drum rotated to the initial or neutral stop position, and then depressing the set-up button or knob 421, after the starting time disc has been set to some hour in advance of the actual time at setting up, and this action will become clear when automatic tuning is described. The depression of this knob causes the contacts 619 and 621 on the upper face of the set-up button switch spring armature bar 433 to close with their associated contacts on the flat spring 541, Figures 26—27—29—30—47 all contacts are suitably insulated from each other and from the elements they are mounted on when necessary as shown by the black insulations under these contacts in the drawings and Figure 47 is a schematic wiring diagram in which actual mechanical construction is eliminated. The contact 621 energizes the solenoid 193 since the switch 623 is normally closed, thus causing the gear 185 to engage with the gear 191, and the contact 619 energizes the forward field of the electric motor within the tuning drum, Figure 4, whereupon rotation of the motor causes the locking block 143 to clamp the first wavelength disc to the drum at the initial or neutral stop position of the said drum. All of the wires P are connected together with the electromagnet 751 in series and form one leg of the lead 617—617, and all of the wires G are connected together and form the other leg of the lead 617—617. In the above, the contacts 621 and 623 connect P to G through the solenoid 193, and the contacts 619 connect P and G through the lead 619a and the forward field F of the motor. The contacts 619 also connect P and G through the leads 619a and 725a, thereby energizing the electromagnet 725 which closes the contacts 731. As soon as the gear 191 which is in mesh with the locking block shaft gear 145 begins to rotate, the contacts 625 close since they are operated by the action of the pin 627, which is suitably fastened in the web of the gear 191, on the flat spring switch 629 which is suitably fastened in the tuning drum, Figures 4—12—47. The closing of the said contact 625 energizes the electromagnet 449, Figures 26—27, whereupon the set-up button switch spring armature bar 433 is drawn closer to the electromagnet 449 which breaks the contact 631 on the lower face of the armature bar 433 from its associated contact on the bent spring 477 and advances the stopping time cam and disc fifteen minutes as previously explained. The closing of the contacts 625 connects P and G through the electromagnet 449 by means of the leads b, b, which connect to b, b, and the contacts 731 which are now closed as explained above. The breaking of the contact 631 causes the electric light bulb 551 to extinguish, which indicates that the set-up button 421 can be released. In the series circuit containing the bulb 551, P and G are connected through the contacts 691 which are now closed, and the contacts 631. The electric motor continues to revolve and move the locking block until the said locking block has moved from the first disc to the second disc, whereupon the contacts 625 are opened by the pin 627 after one revolution of the gear 191 and the electromagnet 449 is no longer energized, whereupon, the electric motor within the tuning drum stops, and the electric light bulb 551 relights provided that the set-up button 421 is not held depressed, as previously explained. The first remote control wavelength is then inserted into the tuning drum by rotating the said drum by means of the tuning knob 535 until the tuning scale 545 indicates the desired wavelength through the opening 547, Figures 1—4, and the set-up button 421 is again depressed, which causes the cycle as explained above to repeat. Similarly all of the wavelengths desired for remote control or automatic tuning are clamped to the tuning drum and it is manifest that all unclamped wavelength discs will be held rotating with the drum by the normal action of the zero retaining springs 315 which engage the notches 118 of the wavelength discs 117.

It is apparent that the first depression of the set-up button has affected the neutral stop position return mechanism as previously explained, but this is of no consequence in the clamping of remote control wavelength discs to the drum as will be made clear henceforth.

It is not necessary to have as many as seven remote control wavelength settings besides the "off" position, but in any event it is necessary to clamp the first eight wavelength discs to the tuning drum, so, in order to insure the clamping of these eight discs it is desirable to depress the set-up button more than eight times without necessarily rotating the tuning drum after the last desired remote control wavelength is inserted into the tuning drum.

The unit is now ready to be adjusted for automatic tuning. We shall suppose that some definite time program of different wavelengths has been decided upon, that it is now before noontime, and the first wavelength desired is to commence at twelve-fifteen noon. The starting time disc 373 is accordingly rotated by pulling out the set-up button 421, and rotating the same in a clockwise direction, so that the starting time disc rotates one complete revolution in the counterclockwise direction, whereupon, the stopping time cam lines up with the starting time cam as previously explained. Since one complete revolution of the starting time disc, necessarily causes the stopping time disc to coincide with the actual time somewhere during its rotation, the effect is the same as would result at the expiration of a time interval of automatic tuning. Suffice it to say now that the locking block is therefore caused to unlock all wavelength discs beyond the eighth or last remote control disc and come to rest at the ninth disc ready to reclamp this disc, and the neutral stop position return mechanism assumes its neutral position.

Figure 46:
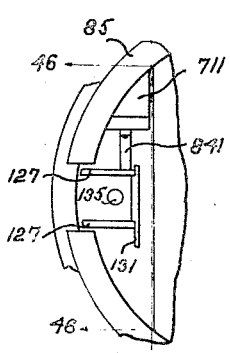
Figure 46 is a view showing the same as Figure 45.
Figure 45:
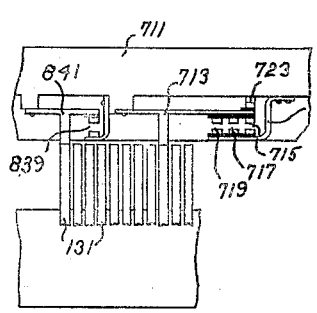
Figure 45 is a view showing the arrangement of the remote control disc retainer switch and the locking block end-of-run switch, taken on the line 46—46 of Figure 46.

Rotation of the starting time disc is continued in the counterclockwise direction until the numeral twelve is visible through the opening 389 and set directly above the second line from the left on the clock face between the two openings 389 and 391 of the clock face 363, Figure 11, whereupon, the starting time is adjusted. Automatically, as previously explained, the stopping time also registers the same hour, since the numeral twelve of the stopping time disc 367 is directly under the said second line. The tuning drum is then rotated to the wavelength desired between twelve-fifteen to twelve-thirty and the set-up button is depressed to clamp this wavelength setting to the tuning drum, and the stopping time cam and disc advance fifteen minutes as described above. The balance of the wavelengths desired for automatic tuning are then inserted into the tuning drum by rotating the said drum to the wavelengths desired and depressing the set-up button after each rotation, and it is manifest, that if a wavelength is desired for more than fifteen minutes, the set-up button is depressed once for each fifteen minutes desired without changing the rotated position of the tuning drum. Also, if the radio receiving set is desired to be shut off for fifteen minutes or any multiplicity of fifteen minutes at any time during the time interval set-up for, the tuning drum is rotated to initial or neutral stop position and the wavelength discs are similarly clamped to the drum at this position. In Figure 11, we show how the stopping time disc would appear if the invention were to shut off the radio set at four-thirty. The end-of-run safety switch 623 which is similar to the corresponding switch 839, Figures 45—46, is located adjacent to the tail of the last wavelength disc clamp so that depression of the set-up button will not cause the electric motor in the tuning drum to operate when the limit of the invention for automatic tuning has been reached.

When the set-up button is depressed for the first wave length desired for automatic tuning, the neutral stop position return mechanism is so affected as previously stated to cause the contacts 633, 635, and 637, which are mounted on the bottom of the armature bar 475 to make contact with their associated contacts on the spring contact bracket 479, Figures 31—32—47. The contacts 633 are series connected with the main power line to the contacts on the starting and stopping time switch spring 381 so that when the neutral stop position return mechanism armature bar 475 is neutralized at the expiration of the time interval set up for, the wavelength program will not repeat itself twelve hours in the future. The contacts 635 only carry current at the expiration of the said time interval so they will be omitted for the present and the contacts 637 cause the electric light bulb 639 to light, and this bulb is suitably suspended from the top guide rod 73 by the bracket 641 and is visible through the preferably colored window 643 which is set in the front plate 61 vertically above the opening 547. This indicator is provided to show that the invention has been adjusted for a future program and thereby prevent another person from disturbing the set-up.

When the actual time twelve fifteen in our example, for automatic tuning to begin arrives, the spring 385 reaches the end of the starting time cam 355 and the said spring distends from the flat switch spring 381, and the normal distending action of the spring 387 causes the switch spring 381 to depart from the tuning drum axis and cause the contacts 645 and 647 on the upper face of the spring 381 to make with their associated contact points on the switch contact mount 383, Figures 9—10—47. The contacts on the switch spring 381 are all connected to one common commutator ring 337 and the two contact points 645 and 647 on the mount 383 are connected to two other rings 337 which are connected to the contacts 649 and 651 on the fifteen minute switch lever 403, and the leads to the commutator rings are through the contact fingers 417. Connected between the contact 645 and the contact 649 are the contacts 653 which are normally closed. Exactly on the fifteen minute mark the cam 401 Figures 20—21 causes the contacts 649 and 651 to make with their associated contacts on the contact block 407 as previously explained, and the solenoid 255, and the forward field of the tuning drum motor are energized, whereupon the automatic tuning wavelength selector carriage 81 moves longitudinally parallel to the tuning drum axis until the wavelength selector arms of the automatic tuning wavelength selector carriage 81 are directly over the ninth disc or the first disc of automatic tuning, and where the said selector arms are stopped by the action of the contacts 655. The closing of the contact 649 connects P to G and energizes the solenoid 255 as follows. One side of the solenoid 255 is connected to G, the other side is connected to one side of the contacts 649 by the lead 255a, the other contact of 649 is connected to one contact of 653 which is now closed and the other contact of 653 is connected to contact 645 which is now closed with its associated contact on 381, whereupon the connection between aa and aa which are connected together and the contacts 633 which are now closed connects the solenoid 255 to P. One side of the contacts 651 is connected by the lead 651a to the lead 619a which in turn is connected through the forward field F of the motor to G, and the other contact of 651 is connected through 403 to 647 which is connected through 381, aa and 633 as previously explained to P, since the contacts 647 and 633 are now closed also. One of the contacts 655 is mounted on the under face of the free end of the warped flat spring 657 Figures 16—17—18 which is fastened to the under face of the gear bracket 233 and suitably fastened in the web of the gear 243 is the pin 659 which projects slightly into the space between the gears 243 and 231, and fastened to the spring 657 is the partly cut away spring 661, the free end of which is distended upward from the top face of the spring 657. This spring mechanism is such that rotation of the gear 243 in the direction required to move the automatic tuning wavelength selector carriage for automatic tuning causes the pin 659 to slide along the upper face of the distended spring 657 and cause the contact 655 to make with its associated contact on the contact bracket 663 which is fastened to the side plate 65, whereas rotation in the reverse direction causes the pin 659 to slide along the under face of the spring 661 and prevent the contacts 655 from making, and complete rotation in this reverse direction is possible because of the cut away section of the spring 661 which allows the pin 659 to come past the spring 661 after sufficient reverse rotation.

The closing of the contacts 655 energize the electromagnet 409 which acts on the forked lever 413, Figures 4—20—21—47, and breaks the contacts 649 and 651 as previously explained, and also makes the contacts 665 and 667, which are on the fork shaped lever, with their associated contacts on the electromagnet 409. The two contact points 665 and 667 are connected to the same power line, and the contact 665 on the electromagnet 409 energizes the solenoid 295 thus causing the wavelength selector arms 277 of the automatic tuning wavelength selector carriage 81 to close on the wavelength disc, and the contact 667 on the electromagnet 409 energizes the gear shifter solenoid 211 which causes the gear 119 to disengage from the idler gear 203 and engage the stationary gear 215. The closing of the wavelength selector arms on the wavelength disc causes one of the automatic neutralizing wavelength selector arm switches 281 to be in contact with the said wavelength disc and the other does not touch the said disc, as is usually the case, Figures 12—13. On one of these wavelength selector arm switches are the contacts 669 and 671 and on the other are the contacts 673 and 675, and the contact points 669 and 675 form an unbroken series connection between P and G through the electromagnet 677, when the contacts 669 and 675 are closed but should one be open the series connection is broken. One of each of the contacts 671 and 673 is connected to a common power line and the others are connected, one to the forward field and the other to the reverse field of the tuning drum motor, whereupon when the contact 671 is closed the contact 669 is open and the contact 675 is closed with the contact 673 open. One of the contacts 671 is connected through the lead 671a and the contacts 729 which are normally closed to the reverse field R of the motor. One of the contacts 673 is connected by the lead 673a to 651a to 619a and hence to the forward field F of the motor. Hence, the tuning drum motor revolves in such direction as to cause both fields of the motor to be un-energized and the tuning drum rotates in the proper direction around the periphery of the gear 215 to tune in the desired wavelength.

When the wavelength desired is tuned in the electric motor is shut off by the breaking of the contacts 671 and 673 and the tuning drum is stopped exactly at the desired position by the stop action of the projections 285 on the automatic neutralizing wavelength selector arm switches 281, and the contacts 669 and 675 close, causing the series connection mentioned above which energizes the electromagnet 677 Figures 16—17—18—47. The electromagnet 677 is suitably mounted vertically on the dielectric rear plate 63 under the free end of the warped spring 657, and suitably pivoted to a stud which is fastened perpendicular to the rear plate 63 is the substantially V shaped lever 649, one leg of which is acted on by the electromagnet 677 and the other leg of which engages a corrugation which is an integral part of the warped spring 657 and is disposed on the lower face of the free end of the said warped spring. The lever 769 is normally held from the said corrugation by the normal action of the helical spring 681, one end of which is fastened to the engaging leg of the said lever and the other end of which is fastened to the stud 683 which is fastened perpendicular to the end plate 63. When the electromagnet 677 is energized the lever 679 engages the corrugation of the warped spring 657 and breaks the contact 655, and when the gear 243 is again revolved to move the automatic tuning wavelength selector carriage to the next wavelength disc the pin 659 on the gear 243 can slide along the cut away spring 661 by pushing the spring 659 closer to the warped spring 657, and as soon as the pin 659 has left the spring 661, the normal action of the helical spring 681 withdraws the lever 679 from the said corrugation. However, as long as the pin 659 rests against the upper face of the spring 661 the lever 679 is held in the said corrugation even though the electromagnet 677 is no longer energized as is normally the situation.

As soon as the contact 655 is broken the electromagnet 409 is no longer energized, and the spring action of the bend 413—A of the bent lower leg of the fork shaped lever 413 separates the contacts 665 and 667, Figures 20—21, whereupon, the solenoid 295 and the solenoid 211 are no longer energized and the wavelength selector arms of the automatic tuning wavelength selector carriage 81 are withdrawn from the wavelength disc by the normal action of the helical springs 301, Figure 12, and the neutralizing switch leaves 287 are held centrally located with respect to the U shaped sections of the switches 281 by means of the studs 305, and the gear 199 reengages with the idler gear 203. Fifteen minutes later, the fifteen minute interval switch can again repeat this cycle in tuning in the second wavelength setting as explained previously in the constructional description. By referring to the wiring diagram, Figure 47, it will become manifest that because of the similarity between the contacts on the wavelength selectors arms of both the automatic tuning wavelength selector carriage and the remote control wavelength selector carriage and their electrical connections, five leads are sufficient for both, hence, we prefer to use the guide rods 73, 75, 77, and the threaded shafts 249 and 251 with suitable brushes for our leads to these contacts, thereby eliminating pigtail leads and lose wires. Each of the wavelength discs is engaged by the wavelength selector arms and when the automatic tuning wavelength selector carriage 81 reaches the last or limiting disc of the tuning drum, the spring switch 685, Figures 47—48—49 which is suitably fastened to the side plate 65 is acted on by the automatic tuning wavelength selector carriage block 289, Figures 4—13 and causes the end-of-run safety contacts 653 to open, whereupon, the solenoid 255 cannot be energized from the fifteen minute interval switch and the automatic tuning wavelength selector carriage cannot move farther than the last disc on the tuning drum.

Figure 48:
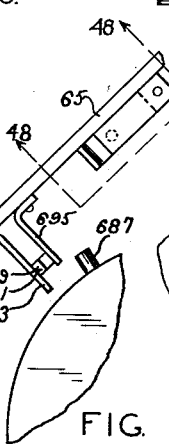
Figure 48 shows an end-of-run switch together with the "off" switch.
Figure 49:
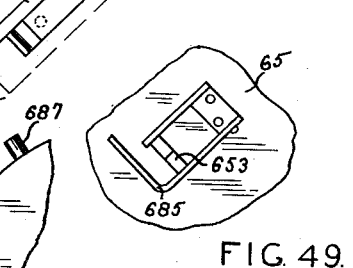
Figure 49 shows the end-of-run switch of Figure 48 taken on the line 48—48 of Figure 48.
Figure 41:
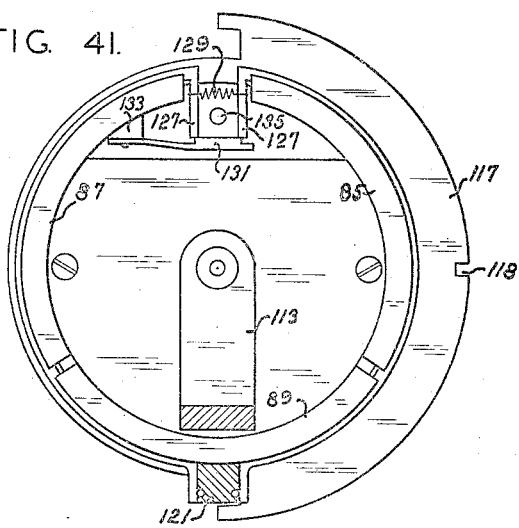
Figure 41 is an end view of the tuning drum taken on the line 31—31 of Figure 4, leaving out unessential detail and showing in particular the shape and arrangement of the springs for retaining the disc clamps in an open position.

If, during the time interval set up for, and "off" period has been included, the tuning drum is revolved to the initial or neutral stop position in exactly the same manner as a wavelength is tuned in, whereupon, the pin 687 which is suitably fastened to the periphery of the drum and projecting from the drum, Figures 47—48, separates the contacts 689 and 691. One of each of the contact points 689 and 691 is mounted on the switch spring 693 which is fastened to the side plate 65, and the associated contact points 689 and 691 are mounted on the contact bracket 695 which is also fastened to the side plate 65, and the normal action of the spring 693 is to close the contacts 689 and 691. The contact points 689 make a series connection with a power line to a radio receiving set and the contacts 691 make a series connection with the electric light bulb 551, whereupon, the breaking of the contacts 689 shut off the radio receiving set and the breaking of the contacts 691 extinguish the electric light bulb 551.

Figures 50, 51:
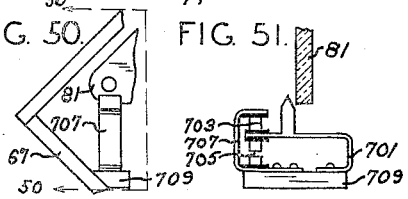
Figure 50 shows another end-of-run switch.
Figure 51 shows the same as Figure 50 taken on the line 50—50 of Figure 50.

At the expiration of the time interval set up for the spring 387 reaches the end of the stopping time cam and distends from the flat switch spring 381, and the normal action of the spring 381 causes the said spring 381 to move inward toward the tuning drum axis and close the contacts 697 and 699 which are mounted on the under face of the free end of the spring 381, with their associated contact points on the contact mount 383, Figures 9—10—47. The contact points 697 and 699 on the mount 383 are connected to the two remaining commutator rings 337, and by means of the contact fingers 417, the contact 697 is brought through the remote cotrol disc retainer switch to the reverse field of the tuning drum motor, and the contact 699 is brought through an automatic tuning wavelength selector carriage end-of-run switch to the solenoid 255. The said end-of-run switch is suitably mounted on the side plate 67 Figures 50—51, and consists of a substantially U shaped switch spring 701 which has a projection, and the said projection is acted upon by the automatic tuning wavelength selector carriage 81, to open the contacts 703 and close the contacts 705 when the said carriage occupies a position between the eighth and ninth wavelength discs. The associated contacts 703 and 705 are mounted on the inside faces of the substantially U shaped contact bracket 707 which is together with the switch spring 701, fastened to the insulating block 709 which is suitably fastened to the side panel 67. As soon as the automatic tuning wavelength selector carriage 81 has proceeded to engage the ninth disc or the first disc of automatic tuning, the contacts 703 close by the normal action of the switch spring 701 and remain closed until the return of the said selector carriage. The said remote control disc retainer switch mentioned above is located within the tuning drum adjacent to the tail 127 of one of the wavelength disc clamps 119 of the ninth disc or the first automatic tuning disc, Figures 45—46. Suitably fastened to the section 85 of the tuning drum is the insulating block 711, to which is fastened the switch spring 713 which has a projection which is acted upon by the wavelength disc clamp tail 127 of the ninth disc from the drum end ring 93. Mounted on the same face of the switch spring 713 as the said projection and at the free end are the three contacts 715, 717, 719, which make with associated contacts on the contact bracket 721, and on the opposite face of the said switch spring is the contact 723, which has its associated contact on the insulating block 711. When the locking block 143 unclamps the said ninth wavelength disc the contacts 715, 717 and 719 are opened and the contacts 723 are closed, whereupon the locking block is stopped without unclamping any of the first eight wavelength discs.

When the stopping time arrives, as previously stated current is brought from the switch spring 381 through the contacts 699 and the contacts 703 to energize the solenoid 255, and current is also brought through the contact 697 and the contacts 715 and 717 to energize the reverse field of the electric motor in the tuning drum and the contacts 719 energize the solenoid 193, Figure 47, which action causes the automatic tuning wavelength selector carriage 81 to move from the last wavelength disc of automatic tuning back to a position between the eighth and ninth wavelength discs and the locking block unclamps all of the automatic tuning discs except the first eight which are established for remote control and their settings are usually maintained. The switch spring 381 is connected through as previously stated to P. The contacts 699 are connected by 701a, to the contacts 703 which are now closed, to the solenoid 255 through the leads 703a and 255a and thence to G. The contacts 697 are connected by 697a to 715 which is now closed and the current from P therefore goes through 717, 717a, to 671a and therefore through the contacts 729 which are now closed, to the reverse field R of the motor. P is also connected to G through the solenoid 193 by the contacts 715, through the switch spring 713, the contacts 719 and the lead 719a. Since the said wavelength carriage and the locking block both move back at the same time, it is necessary in our embodiment of the invention for the said wavelength carriage to move back faster than the locking block and this is accomplished by the proper choice of the necessary gear ratios throughout our invention. It is manifest, that because of the stopping time cam it is impossible for the automatic tuning wavelength selector carriage 81 to endeavor to tune in a wavelength disc beyond the last disc clamped by the locking block, and therefore the locking block can never get back to its initial starting position before the wavelength selector carriage 81 gets to its initial starting position. Parallel connected with the forward field and the armature of the tuning drum electric motor is the electromagnet 725, Figures 1—4—34—47. The electromagnet 725 is suitably fastened to the tuning drum mounting bracket 113 in the intersection of the side plates 69 and 71 and with its axis lying parallel to the tuning drum axis. This electromagnet actuates the L-shaped switch spring 727 one leg of which is fastened to the dielectric T shaped contact mounting block 729 and the other leg is operated by the said electromagnet and on the movable leg are the contacts 729 and 731, each on opposite faces, and these contacts make with associated contacts mounted, one of which is mounted on the block 729 and the other of which is mounted on the electromagnet 725. Normally, when the said electromagnet is not energized, the contacts 729 are held closed by the normal action of the switch spring 727, but when the forward field of the tuning drum motor is energized the electromagnet 725 is also energized, which causes the contacts 729 to break and the contacts 731 to make and the contacts 731 are series connected with the set-up button electromagnet 449 so that the set-up button is only electrically operative when the forward field is used. The purpose of this electromagnet 725 and its associated contacts is to prevent the simultaneous energizing of both the forward and reverse fields of the electric motor, and at the same time the making of the contact 625 associated with the locking block motion will not cause the stopping time cam and disc to advance when the reverse field of the said motor is used to unclamp the wavelength discs. In the wiring diagram, Figure 47, the leads *aa* and the leads *bb* are respectively connected together with *aa* to *aa* and *bb* to *bb*.

When the automatic tuning wavelength selector carriage 81 comes back to initial starting position it acts on the automatic tuning wavelength selector carriage end-of-run switch spring 701 which breaks the contacts 703 and makes the contacts 705 while the locking block is still unlocking wavelength discs. The solenoid 255 is no longer energized when the contacts 703 are broken and the said wavelength carriage stops between the eighth and ninth discs and the closing of the contacts 705 carry current from the switch spring 381 to the remote control disc retainer switch spring 713. As soon as the locking block comes back to the wavelength disc clamp tails of the ninth wavelength disc the contacts 715, 717, and 719 break and the contacts 723 make which carries current through the lead 723a to the initial of neutral stop position return mechanism, and in particular to the contact 635 which is mounted on the bottom face of the neutral stop position armature bar 475, and since the contacts 635 were closed when the first automatic tuning wavelength was locked into the tuning drum and has remained so closed, current is transmitted to the contacts 733 which are mounted on the switch springs 483 and 485 and which are normally held closed by the normal action of the switch spring 483, and the low impedance electromagnet 735 is energized, Figures 31—47. This electromagnet is of low impedance since it is in series with the electromagnet 211, so connected by the lead 735a and its only function is to operate a small switch, and it is suitably fastened to the dielectric side plate 69 near the intersection of the side plates 69 and 71 with its axis lying in a plane perpendicular to the tuning drum axis, Figures 1—4—34, and it acts on the L shaped switch spring 737, one leg of which is fastened to the side plate 69 and the other leg of which is free and acted on by the said electromagnet. On the free end of the said switch spring is the contact 739 which makes with its associated contact on the inside face of the substantially U shaped contact bracket 741, which is fastened to the side plate 71. The contacts 739 are held normally open by the normal action of the switch spring 737 but the energizing of the electromagnet 735 causes these contacts to make whereby current is brought to the reverse field of the tuning drum motor. This is by means of the lead 723a and the lead 739a which are connected to 671a and through the contacts 729 which are closed, and then to the reverse field R of the motor. The energized solenoid 211 causes the gear 197 to mesh with the stationary gear 215 and the energized reverse field of the motor causes the tuning drum to revolve in the clockwise direction so that the zero bar 121 passes through the bottom arc of the tuning drum path, Figure 4 and when the said zero bar reaches a position diametrically opposite the initial or neutral stop position, the projecting pin 481 breaks the contact 733 and makes the contact 743.

The breaking of the contact 733 disconnects the electromagnet 735 which causes the contacts 739 to separate and the reverse field of the tuner drum motor is no longer energized nor is the solenoid 211 whereupon the tuning drum stops rotating. The making of the switch springs 483 and 487, i. e. the contacts 743, energize the electromagnet 499 momentarily. This electromagnet 499 actuates the neutral stop position armature bar 475 which is held toward the electromagnet 499 by the step 467—B of the lever 467 as explained in the constructional description. This causes the contacts 745, 747, 749 which are mounted on the upper face of the armature bar 475 to make with their associated contacts on the spring contact bracket 491 Figures 31—47. The contacts 747 and 749 on the armature bar 475 are directly connected with the contact 723 on the insulating block 711, Figures 45—47, and the contact 749 on the bracket 491 is connected to the solenoid 211 by the leads 749a and 735a, and the contact 747 is connected to the forward field of the tuning drum motor, and the contacts 745 are in series with the power line and the spring switch 381 similar to the contacts 633 which are on the opposite face of the armature bar 475.

The tuning drum is now caused to rotate in the counterclockwise direction around the periphery of the stationary gear 215 until the projecting pin 471 acts on the lever 467 and causes the armature bar 475 be neutrally held by the step 467—A Figures 31—47, whereupon the tuning drum stops at the initial or neutral stop position, with all of the automatic tuning wavelength discs engaged by the springs 315 as previously explained and the radio receiving set shuts off and the electric light bulbs 551 and 639 are extinguished and the invention is ready to accommodate a new series of automatic tuning wavelength settings.

We shall now describe the electrical steps that are gone through in using the remote control unit. This unit can be used at any time at all except when the automatic tuner is going through a definite cycle, such as tuning in a station, etc. Connected in series with one of the power input leads 617 as shown in Figure 40 is the low impedance electromagnet 751 which is suitably fastened to the dielectric front plate 61 in the trough formed by the intersection of the side plates 69 and 71 and with its axis parallel to the tuning drum axis Figure 4. This electromagnet actuates the substantially L shaped spring switch 753 one leg of which is fastened to the dielectric block 729 and the free leg of which is actuated by the said electromagnet, and mounted on the said spring switch is the contact 755 with its associated contact on the dielectric block 729. The contacts 755 form a series switch between the step-down transformer primary 757 and the main power leads 617. The electromagnet 751 is of low impedance since its only purpose is to break the contacts 755 and thereby make the remote control unit inoperative whenever current in excess of the amount required to light the electric light bulbs 551 and 639 is drawn by the automatic tuner such as when clamping wavelength discs to the tuning drum or actually tuning in an automatic tuning wavelength. The secondary 759 of the said transformer produces a voltage that is sufficiently low to permit the use of such voltage in the cable which may pass across the floor of a room and under a rug to the remote control unit, and the said transformer is preferably included in the automatic tuning unit in the space provided in the trough formed by the side plates 69 and 71 and adjacent to the gear 537.

In order to tune in a remote control wavelength the remote control station selector knob 611 is depressed and rotated in either direction until the indicator on the said knob is opposite the call letters of the desired station Figure 40 and as previously explained, the knob 611 remains depressed and the contact bar 593 is angularly displaced with relation to the solenoid 583, which causes one of the brushes 601 to leave the contact stud 599 and slide along its associated contact strip 597 while the other brush 601 is held free from all contact. The contact strips 597 are both directly connected to one lead of the transformer secondary and one end of the solenoid 583 is also connected to this same lead. One of the brushes 601 is connected to the electromagnet 761 and the other is connected to the electromagnet 763. These electromagnets lie in the trough formed by the intersection of the side plates 69 and 71 Figure 4 and are fastened to these side plates by suitable clamps 765 with their axis in the same straight line parallel to the tuning drum axis. Disposed between the actuating ends of these electromagnets is the T shaped dielectric contact mount 767 which is fastened to the side plates 69 and 71, and actuated by the electromagnet 761 is the switch spring 769 one end of which is fastened to the contact mount 767 and the other end of which is actuated by the electromagnet 761. Mounted on the free end of the switch spring 769, are the contacts 771 and 773 which have their associated contacts on the contact bracket 775 and the contacts 771 and 773 are normally held open by the switch spring 769. The contacts associated with the electromagnet 763 are similar and warrant no explanation and we shall assume that the electromagnet 761 is energized by the rotation of the knob 611, whereupon power is brought through the contacts 771 to the forward field of the tuning drum motor, (the electromagnet 763 causes power to be brought to the reverse field). Simultaneously power is brought through the contacts 777 which are normally closed to the solenoid 263 which causes the remote control wavelength selector carriage 79 to move in the direction from the first disc toward the eighth disc on the tuning drum. Suitably projecting from the dielectric gear 241, Figure 4 is a pin which actuates the warped spring switch 779, by the action of the said pin against a substantially V shaped projection which is an integral part of the said spring switch and the said switch spring is suitably fastened to the under side of the gear bracket 233 Figures 16—17—19, parallel to the warped spring switch 657, and causes the contact 781 which is mounted on the under face of the free end of the spring switch 779 to make with its associated contact on the switch bracket 664 which is suitably fastened to the side plate 65. These contacts 781 close whenever the wavelength selector arms of the remote control wavelength selector carriage are directly over a wavelength disc, whereupon, for each disc passed over by the said wavelength selector arms, the solenoid 583 in the remote control unit is given an intermittent flow of current through the contact 783 which is also in the remote control unit and the solenoid 583 endeavors to line itself up directly under the contact bar 593. The contact 783 comprises the brush 783 which is fastened to the dielectric brush mount 591 and the semicircular contact strip 785 which is fastened to the contact bar 593 and has an insulating strip 787 substantially midway from the ends, and the said insulating strip breaks the contact between the brush 783 and the strip 785 when the solenoid 583 is directly under the contact bar 593. This is to prevent the solenoid 583 from remaining energized when the contacts 781 are held closed by the projecting pin in the gear 241, and the insulating strip 787 is of sufficient width to allow the contacts 781 to be broken before the brush 783 engages the contact strip 785. When the solenoid 583 is directly under the contact bar 593 the electromagnet 761 is no longer energized and the contacts 771 leading to the motor and the contacts 773 leading to the solenoid 263 are broken, also, the knob 611 jumps up which causes an instantaneous closing of the contacts 789, one of which is fastened to the under face of contact bar 593 and the other is fastened to the spring switch 609.

The instantaneous closing and reopening of the contacts 789 energize the electromagnet 791 momentarily, Figures 1—4—34—47, and the electromagnet 791 is suitably fastened to the dielectric side plate 69 with its axis in a plane perpendicular to the tuning drum axis. Associated with this electromagnet is the electromagnet 793 Figures 34—47, which is necessarily held at right angles to the electromagnet 791 by being suitably fastened to the dielectric side plate 71 with its axis lying in the said plane. The electromagnet 791 actuates the free leg of the L shaped switch spring 795, the other leg being fastened to the side plate 69, and on the free end of the switch spring 795 is mounted the contact 797 which makes with its associated contact on the dielectric contact 799 which is fastened to the casing of the electromagnet 791. Fastened to the side plate 71 is the substantially U shaped switch spring 801 having one leg longer than the other, and the longer leg resting against the free end of the switch spring 795 when the contacts 797 are normally open, and the shorter leg being disposed under the switch spring 795 but not in contact with this switch spring. The longer leg of the switch spring 801 is actuated by the electromagnet 793 and the contacts 803 and 805 which are mounted on the inner faces of the U shaped switch spring 801 tend to close by the normal action of the longer leg when the electromagnet 793 is not energized.

The momentary energizing of the electromagnet 791 causes the contacts 797 to close, Figure 47, and they are held in contact by the longer leg of the switch spring 801 dropping under the free end of the switch spring 795, and the contacts 803 also close. The contacts 797 energize the electromagnet 293 which causes the wavelength selector arms of the remote control wavelength selector carriage 79 to close on the correct wavelength disc, and the action of these wavelength selector arms is analogous to automatic tuning and require no further explanation, and the contacts 805 energize the solenoid 211 which engages the gear 199 with the stationary gear 215, and the contacts 803 energize the electromagnet 793 after the station is tuned which break the contacts 803, 805 and 797 and the said electromagnet 793 is disconnected. Similarly, any remote control wavelength or the "off" position is obtained.

In order to change the volume from the remote control unit all that is necessary is to depress the "loud" or "soft" buttons 807 and 809 respectively. We shall explain only one of these as the other is operated similarly, Figures 5—6—38—40—47. Projecting through the top plate 553 and preferably in one corner is one of the dielectric volume control buttons 807, and the inner end of this button is shouldered to retain it in the top plate. Resting against the inner end of the said button is the switch spring 811 which is suitably fastened at one end to the bossed dielectric switch mount 813 which is suitably fastened to the bottom plate 555. Fastened to the under face of the switch spring 811 at the free end are the contacts 815 and 817 which have associated contacts mounted on the block 813, and the normal action of the switch spring 811 breaks the said contacts and holds the button 807 out, and a similar switch is provided in another corner for the button 809. The buttons 807 and 809 are only effective when a station is completely tuned in due to the stud contacts 599. The depression of the button 807 closes the contacts 815 and 817 and the contacts 815 are series connected with the contact stud 599, Figure 47, whereupon, the electromagnet 761 is again energized and the contact 771 energizes the forward field of the tuning drum motor, and the contacts 817 energize the electromagnet 819 which breaks the contacts 777 and causes the current from the contacts 773 to pass through the contacts 821 whereupon the volume control solenoid 505 is energized and the volume is accordingly changed since the rheostat 503 is suitably connected to the radio receiving set to obtain the desired result. Similarly, when the button 809 is depressed, volume in the other direction is obtained. The electromagnet 819 is suitably fastened to the dielectric side plate 69, Figure 34, with its axis on the projection of the axis of the electromagnet 791, and this electromagnet 819 actuates one leg of the U shaped switch spring 823 which is fastened to the side plate 69. Mounted on the inner faces of the U are the contacts 777 which normally make contact when the electromagnet 819 is not energized, and mounted on the free end of the actuated leg of the said U is the contact 821, having its associated contact on the dielectric contact block 825 which is fastened to the casing of the electromagnet 819.

The remote control wavelength discs can be unclamped at any time so that a new list may be inserted into the tuning drum, by rotating the stopping time to some hour previous to the actual time. This will cause the tuning drum and the automatic tuning wavelength discs to return to initial or neutral stop position, whereupon depression of the dielectric button 827 which is located immediately above the opening 547, Figures 1—4, will unlock the remote control wavelength discs and after they are unclamped the tuning drum is manually rotated to its 180 degree position and then back to its initial or neutral stop position which causes the remote control wavelength discs to be engaged by the springs 315 in the notches 118 of the said discs. Clamped to the top guide rod 73 is the dielectric block 829 and on the front and back faces of which are fastened the switch springs 831 and 833 insulated from the rod 73 by large clearance holes and these switch springs suspend downward between the threaded rods 249 and 251. Mounted on the inner faces of these switch springs are the contacts 835 and 837 which are normally held open but depression of the button 827 closes them, and these contacts short circuit the remote control disc retainer switch so that current is brought through the locking block end-of-run switch contacts 839, through the contacts 835 to the reverse field of the electric motor in the tuning drum and through the contacts 837 to the solenoid 193, whereby all of the wavelength discs are unclamped and the power to the contacts 835 and 837 is cut off by the contacts 839 when the locking block unclamps the first disc adjacent to the tuning drum end ring 93. When the locking block unclamps the last disc the movement of the tails of the wavelength disc clamps associated with this disc actuate the switch spring 841 similar to the remote control disc retainer switch spring 713, Figures 45—47.

Figure 42:
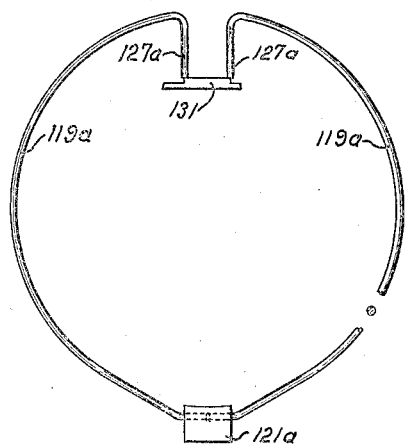
Figure 42 shows an alternative disc clamp to eliminate some of the parts in the tuner described.
Figure 43:
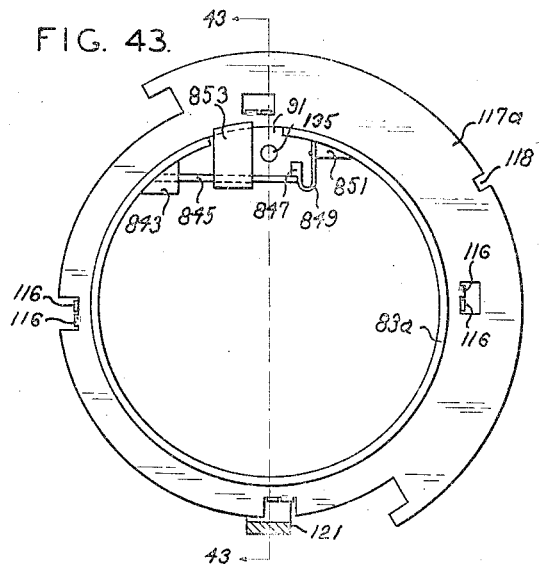
Figure 43 shows an alternative disc, drum and disc clamp design to simplify the invention taken on the line 44—44 of Figure 44.
Figure 44:
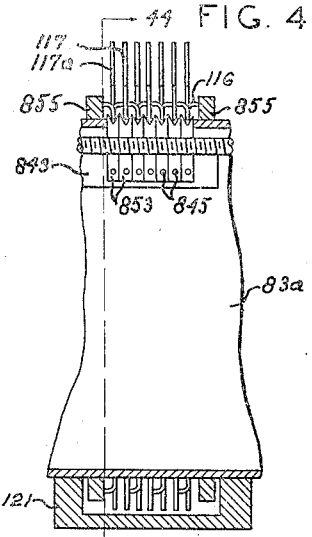
Figure 44 is a cross section taken on the line 43—43 of Figure 43 showing the same as Figure 43.

In Figures 42—43—44, we show two alternative methods for locking the wavelength discs to the tuning drum and in these figures we use the same numeral designations as we have used before with the subscript A; for example 119A signifies the part 119 previously explained but is now in a different form but nevertheless, performing the same function as heretofore. In Figure 42 are the locking clamps 119A which are suitably formed from round spring wire, the projecting tails 127A functioning the same as the tails 127. The clamps are suitably fastened in the zero bar 121A and it is manifest that the helical springs 129 are no longer necessary as the normal spring action of the said clamps 119A will lock the wavelength discs 117 to the tuning drum when the tails 127A are not held separated by the flat retaining springs 131.

Figures 43—44 specifically show a method for mounting the wavelength discs 117 on the tuning drum and clamping the same with the object of eliminating the V shaped grooves 115 from the periphery of the said tuning drum. The tuning drum 83A is now merely a smooth tube with the open space 91. Mounted on this tube free to rotate are the wavelength discs 117 and 117A, alternate discs being exactly the same as 117 and those between (i. e. 117A) being substantially the same as 117 but having the eight self contained projections 116, four of which project equally spaced angularly to one side of the disc, the remaining four similarly project to the other side and the ends of which rest against the flat faces of the discs 117, thereby maintaining the correct separation between disc edges. Suitably fastened to the inner face of the drum 83A is the bar 843 in which are fastened the ends of the wire springs 845. The free ends of the springs 845 are held by the projections 847 which are integral parts of the V shaped flat springs 849, and the springs 849 are fastened to the bar 851 which is suitably fastened to the inner face of the tuning drum 83A. To each of the springs 845 is fastened a locking clamp block 853 in one edge of which is a V groove in which a single wavelength disc rides. When the projection 847 is forced away from the free end of the spring 845, the normal action of the said spring 845 causes the locking clamp block 853 to wedge on the inner edge of a wavelength disc thus locking the said disc to the drum. The springs 845 and 849 are operated by a locking block similar to the locking block 143 in a manner analogous to the cycle of the locking block 143. On the outside of the drum 83A are fastened the rings 855 which keep the wavelength discs properly on the drum.

It is manifest from the construction of invention that by removing the wavelength selector arms, installing simple switches above each of the wavelength discs and permitting the tuning drum to rotate continually in one direction without stopping, plus other minor modifications the device can be used to operate traveling electric signs, electric flashers, theater signs, traffic signals, etc., and the duration of any signal as in traffic signals can be provided for by changing the length of the path of contact of the wavelength discs.

Having now described our invention, we claim:

1. A timing and positioning selector device for rotary apparatus including a drum, means mounting said drum for permitting rotation thereof, a plurality of sectional discs mounted on said drum, said drum having a plurality of V shaped grooves in which said discs are mounted, a clamping ring positioned in each of said grooves adjacent each of said discs, said clamping means comprising a ring opened at one end, means tensioning said open ends to hold said ring in the lower part of said groove and means adapted to be inserted in said open end to relieve said tensioning means.

2. In a timing and positioning selector means, a drum comprising a plate at one end, a plurality of sectional elements forming the wall of said drum attached to said end plate, said drum having a plurality of uniform grooves, an annular disc positioned in said groove, a clamping ring positioned adjacent each of said discs for clamping each of said discs in said grooves, said clamping ring having open ends, means exerting a tension across said open ends, a plurality of locking elements positioned beneath said open ends, means adapted to pass between the open ends of each clamping element successively for separating the same and allowing said locking means to be forced outwards for opening said clamping ring.

3. In a timing and positioning selector means, a drum having a plurality of grooves therein, a plurality of discs positioned in the grooves in said drum, means for locking said discs in said grooves, whereby said discs may be rotated with said drum and means moveable longitudinally with the axis of said drum for unlocking said discs.

4. In a timing and positioning selector means, a drum having a plurality of V shaped grooves about the circumference of said drum, a plurality of discs positioned in said grooves, a plurality of clamping elements being permanently positioned about said drum and being provided with open ends, said open ends all being aligned with a common shaft, wedge means mounted on said shaft and means for rotating said shaft whereby said wedge means may be moved longitudinally of said drum.

5. In a timing and positioning means, a drum having a plurality of V shaped grooves therein, a disc mounted in each one of said grooves, a clamping means having open ends adapted to hold each of said discs against said drum, means normally separating said open ends for unlocking said discs with said drum whereby rotation of said drum will properly position said discs and means moveable longitudinally of said drum for releasing said separating means whereby said disc will move with said drum.

6. In a timing and positioning selector means, a drum having a plurality of grooves therein, a plurality of discs mounted in said grooves, a plurality of clamping means each for independently locking said discs to said drum whereby said disc and drum will move together, and latch means positioned over said discs adapted to engage said discs and retain said discs in a fixed position with reference to the movement of said drum.

7. A clamping ring adapted to clamp an annular disc comprising an open ended circular element having a spring tension tending to force its two open ends together, latching means positioned over the open ends of said circular clamping element, means tensioning said latching means against said open ends and means moveable in the space between said open ends of said circular element for allowing said latching means to come between the open ends of said element.

8. In a timing and positioning selector means, a drum having a plurality of discs mounted thereon and means for positioning said discs with reference to said drum, a frame mounted over said disc, said frame comprising a V shaped element having supporting means at the open ends of said V and means for moving said V shaped frame longitudinally of said drum, electrical contact means mounted on a lever pivoted to said V shaped frame and having projecting elements adapted to engage the edge of said disc whereby when said disc assumes a definite position said contact means are operated.

9. In a timing and positioning selector means, a disc adapted to be rotated, a V shaped frame adapted to be positioned over said disc, said V shaped frame having a pair of pivoted levers and contact elements at the ends thereof, means projecting from said pivoted levers for engaging said disc and means mounted at the vertex of said V for moving said levers in one direction, said discs being adapted to move said contact elements in the opposite direction.

10. In a device of the kind described, a drum having a plurality of discs mounted thereon, means for independently and successively clamping each of said discs to said drum, means for freeing said discs from said drum, and means for holding said disc when said disc is free from said drum, including means mounted over said disc and provided with a V shaped spring adapted to engage a depression in said disc.

11. In a timing and positioning selector means, a drum, a plurality of discs mounted on said drum, spaced apart from one another, means positioned within said drum including a plurality of elements aligned with the edges of the discs, means retaining said last means free from engagement with said discs and means adapted to travel longitudinally of said drum for releasing said retaining means.

12. In a timing and positioning selector means, a remote control mechanism including a pair of independent but aligned shafts, one of said shafts having a bar mounted thereon providing at each side an electrical contact plate, a pair of levers supported with the other of said shafts and in operation making contact with the contact plate on said bar, said last shaft having mounted thereon a solenoid and having a plunger element engaging fixed rods and means externally operated for disengaging said plunger element from said rod and allowing said shaft to move said lever elements to a position free from the contact elements on said bar.

13. In a timing and positioning selector means, a drum having a plurality of discs mounted thereon, clamping means for clamping said discs to said drum comprising a clamping ring having open ends tending to be forced together, spring means having a spacer for coming between the open ends of said clamping means and means movable longitudinally of said drum between the open ends of said clamp for disengaging said spacer when said means is moved in one direction and causing said spacer to engage when the means is moved in the other direction.

14. In a timing and positioning selector means a drum having a plurality of discs thereon, means for positioning said discs each independently in a desired position on said drum, a plurality of means for individually clamping each of said discs to said drum, means operative at the end of a given interval for releasing all of said clamping means and means for returning of said discs to relatively the same initial position that they had with respect to said drum.

ERNST AUGUST NORDBERG.
ARTHUR K. BAKER.